United States Patent
Shah et al.

(10) Patent No.: US 12,492,345 B2
(45) Date of Patent: Dec. 9, 2025

(54) METHOD AND SYSTEM FOR PYROLYSIS

(71) Applicant: ROYAL MELBOURNE INSTITUTE OF TECHNOLOGY, Victoria (AU)

(72) Inventors: Kalpit Shah, Victoria (AU); Kumar Sazal Kundu, Victoria (AU); Rajnikantbhai Savankumar Patel, Victoria (AU); David John Winter, New South Wales (AU)

(73) Assignee: ROYAL MELBOURNE INSTITUTE OF TECHNOLOGY, Victoria (AU)

( * ) Notice: Subject to any disclaimer, the term of this patent is extended or adjusted under 35 U.S.C. 154(b) by 271 days.

(21) Appl. No.: 17/779,357

(22) PCT Filed: Nov. 27, 2020

(86) PCT No.: PCT/AU2020/051287
§ 371 (c)(1),
(2) Date: May 24, 2022

(87) PCT Pub. No.: WO2021/102519
PCT Pub. Date: Jun. 3, 2021

(65) Prior Publication Data
US 2022/0411698 A1     Dec. 29, 2022

(30) Foreign Application Priority Data
Nov. 29, 2019   (AU) ................................ 2019904508

(51) Int. Cl.
*C10B 53/02*   (2006.01)
*B09B 3/40*    (2022.01)
(Continued)

(52) U.S. Cl.
CPC ............... *C10B 51/00* (2013.01); *B09B 3/40* (2022.01); *C02F 11/10* (2013.01); *C10B 47/24* (2013.01);
(Continued)

(58) Field of Classification Search
None
See application file for complete search history.

(56) References Cited

U.S. PATENT DOCUMENTS 2,224,823 A * 12/1940 Klein ........................ C10B 1/04
                                                    201/34
2,657,124 A * 10/1953 Gaucher .................. C10J 3/485
                                                    48/197 R
(Continued)

FOREIGN PATENT DOCUMENTS

CN        1803982 A     7/2006
CN      101294092 A    10/2008
(Continued)

OTHER PUBLICATIONS

European Search report for corresponding application EP 20892807.7 dated Nov. 15, 2023.
(Continued)

*Primary Examiner* — Jonathan Luke Pilcher
(74) *Attorney, Agent, or Firm* — Norris McLaughlin, PA

(57) ABSTRACT

The invention provides a system for pyrolysis, comprising: (i) a gas producer comprising a gasification zone and a producer gas outlet, wherein the gas producer is configured to: oxidise at least one carbon-containing feed in the presence of an oxidising gas in the gasification zone to form a producer gas; and discharge the producer gas from the gasification zone via the producer gas outlet, wherein a residual oxygen content of the producer gas is substantially depleted or maintained below a maximum predetermined amount by controlling a ratio of oxygen fed to the gasification zone to the carbon-containing feed, (ii) a pyrolyzer comprising a pyrolysis zone and one or more pyrolyzer gas outlets, wherein the pyrolyzer is configured to: feed the producer gas discharged from the gasification zone to the pyrolysis zone; pyrolyze a pyrolyzable organic feed in the (Continued)

pyrolysis zone in the presence of the producer gas to produce a carbonaceous pyrolysis product and a gas mixture comprising combustible components comprising pyrolysis gas; and discharge the gas mixture from the pyrolysis zone via the one or more pyrolyzer gas outlets, and (iii) a first combustor comprising a combustion zone, wherein the first combustor is configured to: receive the gas mixture discharged from the pyrolysis zone in the combustion zone; feed an oxygen-containing gas to the combustion zone; and combust at least a portion of the combustible components present in the gas mixture in the combustion zone to produce a combustion product gas.

20 Claims, 11 Drawing Sheets

(51) Int. Cl.

| | | |
|---|---|---|
| *C02F 11/10* | (2006.01) | |
| *C10B 47/24* | (2006.01) | |
| *C10B 49/10* | (2006.01) | |
| *C10B 51/00* | (2006.01) | |
| *C10B 57/10* | (2006.01) | |
| *C10J 3/02* | (2006.01) | |
| *C10J 3/72* | (2006.01) | |
| *F23G 5/027* | (2006.01) | |
| *F23G 7/14* | (2006.01) | |
| *B09B 101/70* | (2022.01) | |
| *B09C 1/06* | (2006.01) | |
| *F23G 5/04* | (2006.01) | |

(52) U.S. Cl.
CPC .............. *C10B 49/10* (2013.01); *C10B 53/02* (2013.01); *C10B 57/10* (2013.01); *C10J 3/02* (2013.01); *C10J 3/721* (2013.01); *F23G 5/0273* (2013.01); *F23G 7/14* (2013.01); *B09B 2101/70* (2022.01); *B09C 1/065* (2013.01); *C10J 2300/0946* (2013.01); *C10J 2300/0956* (2013.01); *F23G 5/04* (2013.01); *F23G 2201/303* (2013.01); *F23G 2202/101* (2013.01); *F23G 2202/103* (2013.01); *F23G 2206/203* (2013.01); *F23G 2209/24* (2013.01); *F23G 2209/281* (2013.01)

(56) References Cited

U.S. PATENT DOCUMENTS

| | | | |
|---|---|---|---|
| 4,069,024 | A | 1/1978 | Fernandes |
| 4,141,794 | A | 2/1979 | Choi |
| 4,900,429 | A | 2/1990 | Richardson |
| 5,034,021 | A | 7/1991 | Richardson |
| 8,217,210 | B2 * | 7/2012 | Agrawal .................. C10B 49/22 585/242 |
| 8,541,637 | B2 * | 9/2013 | Babicki .................... C01B 3/38 48/197 R |
| 9,045,693 | B2 * | 6/2015 | Wolfe ................... F23G 5/0273 |
| 9,599,337 | B2 * | 3/2017 | Pereira Filho .......... F23G 5/006 |
| 2009/0084666 | A1 * | 4/2009 | Agrawal .................. C10K 3/04 201/2.5 |
| 2010/0037519 | A1 | 2/2010 | Patil et al. |
| 2010/0038594 | A1 | 2/2010 | Bohlig et al. |
| 2010/0223839 | A1 * | 9/2010 | Garcia-Perez ......... C12M 45/20 44/451 |
| 2013/0214207 | A1 | 8/2013 | Gharda |
| 2014/0338262 | A1 | 11/2014 | Schwarz et al. |
| 2017/0218285 | A1 | 8/2017 | Parkinson et al. |

FOREIGN PATENT DOCUMENTS

| | | |
|---|---|---|
| CN | 109652146 A1 | 4/2019 |
| DE | 3030593 C2 | 3/1982 |
| JP | 2004035837 A1 | 2/2004 |
| KR | 20110050098 A | 5/2011 |
| WO | 2006/117824 A1 | 11/2006 |
| WO | 2010/110470 A1 | 9/2010 |
| WO | 2012/142489 A1 | 10/2012 |

OTHER PUBLICATIONS

International Search Report dated Dec. 24, 2020, in connection with PCT International Application No. PCT/AU2020/051287.
Australian International-Type Search Report dated Oct. 12, 2020, in connection with Australian Application No. 2019904508.
Written Opinion dated Dec. 24, 2020, in connection with PCT International Application No. PCT/AU2020/051287.
CN Office Action and English translation in corresponding application CN 202080093571.8 dated Jul. 23, 2025.
IN Office Action in corresponding application IN 202217035809 dated Aug. 20, 2025.

* cited by examiner

METHOD AND SYSTEM FOR PYROLYSIS

This is an application filed under 35 USC 371 based on PCT/AU2020/051287, filed 27 Nov. 2020, which claimed priority to AU 2019904508 filed 29 Nov. 2019. The present application claims the full priority benefit of all prior applications and incorporates by reference their full disclosures as if set forth herein.

TECHNICAL FIELD

The invention relates to a pyrolysis system and a method of pyrolysis. The system includes a gas producer to oxidise a carbon-containing feed and thus form a low oxygen content producer gas, a pyrolyzer to pyrolyze an organic feed in the presence of the producer gas to produce a carbonaceous pyrolysis product and a gas mixture comprising combustible components including pyrolysis gas, and a combustor to combust the combustible components present in the gas mixture. The systems and methods of the invention are considered particularly useful for the pyrolysis of biomass and/or the remediation of contaminated biomass, including biosolids, to produce decontaminated biochar products, and it will be convenient to discuss aspects of the invention in relation to these exemplary applications.

BACKGROUND OF INVENTION

Pyrolysis is a high temperature decomposition process for converting a pyrolyzable organic feed (i.e. any feed containing at least a portion of organic, carbon-based material) under non-oxidising conditions, in particular where the oxygen content is sufficiently low that endothermic cracking reactions predominate over exothermic oxidation reactions. The industrial pyrolysis normally operates at medium to high temperatures (350-750° C.) to produce products for energy, fuel or chemical applications. Pyrolysis produces three product streams: a solid carbonaceous product (char), a condensable pyrolysis oil fraction and a non-condensable gas fraction.

The pyrolysis products can be converted to a number of value-added products or can be used in their original form for a number of applications. For example, the char can be used for soil amendment, soil remediation, water purification, composites or as fuel. Where char is the primary product of interest, the oil and/or gas fractions may be combusted to provide the energy needed to drive the endothermic pyrolysis reaction. Excess energy may be used to generate electrical power or utility steam.

Pyrolysis is considered particularly useful for the processing of biomass, including biosolids which are a product of waste water treatment plants. The primary product of interest in such processes is often the biochar. The high temperature pyrolysis advantageously sterilises potentially harmful microorganisms in the biomass and permanently sequestrates a portion of the carbon in the biochar.

It is typically important that facilities for processing biomass are simple and cost-effective to construct and operate. Moreover, such facilities are often required in environments which lack extensive industrial infrastructure. A particular concern is that a suitably inert gas, such as piped $N_2$, may not be available to feed the pyrolysis reactor.

One proposed approach to address this is to recycle a portion of the flue gas from combustion of the oil and/or gas product fractions back to the pyrolysis reactor. However, this requires an expensive high temperature booster fan, or an intermediate heat recovery step where the heat exchangers are susceptible to fouling by the combustion gas. Moreover, recycling introduces inherent process complexity which increases costs and the likelihood of operational challenges.

A further issue is that the overall process for pyrolysis of many biomass sources, including biosolids, requires significant input of energy, even when the pyrolysis oil and gas fractions are completely combusted, because of the high water content and/or low energy content of the biomass feedstock. This is undesirable from both an economic and environmental perspective. Moreover, biomass feedstocks may be variable in energy content and composition, and it would be desirable to flexibly operate a pyrolysis process to maximise biochar yield while nevertheless remaining net energy-positive for different feedstocks.

Another concern is that biomass feedstocks, including biosolids, may be contaminated with harmful chemical contaminants, for example per- and polyfluoroalkyl substances (PFAS). PFAS are manufactured chemicals which are of particular concern due to their persistence, bioaccumulation properties and environmental toxicity. Materials contaminated with PFAS are considered particularly difficult to remediate due to the high thermal stability of these compounds, and thus may not be adequately decontaminated by direct pyrolysis. Furthermore, when using such contaminated feeds, post-pyrolysis combustion should be optimised to substantially degrade or combust the vaporised contaminants (or their partial degradation products) present in the gaseous product stream from pyrolysis. The high temperatures and excess oxygen required to achieve this further complicates efforts to recycle a non-oxidising combustion product stream to pyrolysis.

A further issue in many pyrolysis systems is that heat transfer between combustion and pyrolysis may be unsatisfactory, resulting in poor heat distribution and thus low rates of pyrolysis and/or poor or inconsistent quality of char products. Moreover, some feedstocks which it would be desirable to pyrolyze produce low yields of volatile combustible pyrolysis products (i.e. oil and gas fractions), such that the pyrolysis product gas is below the flammability window or contains insufficient combustible components to provide the heat of pyrolysis when corn busted.

There is therefore an ongoing need for new systems and method for pyrolysis, which at least partially address one or more of the above-mentioned short-comings or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

The inventors have now found that a suitably non-oxidising feed for pyrolysis may be produced in a gas producer located upstream of the pyrolyzer. A carbon-containing feed, which may be the same or different as the pyrolysis feed, is oxidised in the gas producer with an oxidising gas under conditions tailored to produce a low oxygen-content product gas. Advantageously, the gas producer provides this supply of non-oxidising gas feed to pyrolysis in a highly controllable way due to the lack of competing process constraints on its operation. Thus, the need for a separate inert gas supply (e.g. piped nitrogen) is avoided, and there is no requirement to recycle an oxygen-depleted gas produced by combustion/gasification of the pyrolysis gas product. The pyrolysis systems of the invention may thus be simple and cheap to construct and operate due to the process control simplicity and the lack of recycle streams. Since post-pyrolysis combustion need not be operated to produce a suitable pyrolysis feed, it may be operated optimally for one or more other purposes.

Furthermore, the gas producer may be operated under partial oxidation conditions such that the product gas contains combustible components including carbon monoxide and hydrogen. These components may supplement the pyrolysis gas when combusting the gas mixture discharged from the pyrolyzer, thus increasing the combustibility of the gas mixture sent from pyrolysis to the combustor and increasing the heat of combustion.

The use of sequential gas producer and pyrolyzer may also advantageously facilitate the processing of low energy content and/or wet biomass feedstocks while minimising or avoiding the need for external energy input. By directing a portion of the feedstock to an exothermic/autothermal gas producer which will produce more gas then char, the overall energy balance of the pyrolysis process is moved in a positive direction, preferably to at least energy neutrality. Moreover, there is an opportunity to operate flexibly depending on the feedstock composition. For a low energy content and/or wet biomass feedstock, a greater proportion can be directed to the exothermic/autothermal gas producer. For a high energy content and/or drier biomass feedstock, the proportion directed to the endothermic pyrolysis process may be increased while maintaining an overall process energy balance which is neutral or positive, so that a higher yield of biochar can be achieved.

In some embodiments, a contaminated solid material may also be remediated in the gas producer. The contaminants are vaporised and/or partially or completely destroyed in the gas producer by oxidation or thermal degradation mechanisms. The vaporised products are then carried through the subsequent pyrolysis and combustion units for further degradation, capture in the char product, and/or post-combustion recovery.

In accordance with a first aspect the invention provides a system for pyrolysis, comprising: (i) a gas producer comprising a gasification zone and a producer gas outlet, wherein the gas producer is configured to: oxidise at least one carbon-containing feed in the presence of an oxidising gas in the gasification zone to form a producer gas; and discharge the producer gas from the gasification zone via the producer gas outlet, wherein a residual oxygen content of the producer gas is substantially depleted or maintained below a maximum predetermined amount by controlling a ratio of oxygen fed to the gasification zone to the carbon-containing feed, (ii) a pyrolyzer comprising a pyrolysis zone and one or more pyrolyzer gas outlets, wherein the pyrolyzer is configured to: feed the producer gas discharged from the gasification zone to the pyrolysis zone; pyrolyze a pyrolyzable organic feed in the pyrolysis zone in the presence of the producer gas to produce a carbonaceous pyrolysis product and a gas mixture comprising combustible components comprising pyrolysis gas; and discharge the gas mixture from the pyrolysis zone via the one or more pyrolyzer gas outlets, and (iii) a first combustor comprising a combustion zone, wherein the first combustor is configured to: receive the gas mixture discharged from the pyrolysis zone in the combustion zone; feed an oxygen-containing gas to the combustion zone; and combust at least a portion of the combustible components present in the gas mixture in the combustion zone to produce a combustion product gas.

The carbon-containing feed to the gas producer typically does not comprise the carbonaceous pyrolysis product from the pyrolyzer. In some embodiments, the pyrolyzer is configured to discharge at least a portion of the carbonaceous pyrolysis product as an unoxidised product from the system.

In some embodiments, the maximum predetermined amount is no more than 4 wt %, or no more than 2 wt %, such as no more than 1 wt %. In some embodiments the residual oxygen content of the producer gas is substantially depleted, for example to substantially zero.

In some embodiments, the oxidising gas is an oxygen-containing gas, such as air. In some embodiments, the gas producer is configured to partially oxidise the at least one carbon-containing feed such that the producer gas comprises carbon monoxide and/or hydrogen.

In some embodiments, the gas producer is configured to feed a first contaminated solid material to the gasification zone for vaporisation and/or destruction of one or more contaminants therein. The gas producer may comprise a solid material inlet for feeding the first contaminated solid material to the gasification zone and a solid material outlet for discharging a decontaminated solid material from the gasification zone.

In some embodiments, the system is configured to: separate a feedstock into first and second fractions; direct the first fraction to the gas producer to form at least a portion of the at least one carbon-containing feed; and direct the second fraction to the pyrolyzer to form at least a portion of the pyrolyzable organic feed. The system may be configured to adjust the ratio of the first fraction to the second fraction to vary a net energy output of the system.

In some embodiments, the pyrolysis zone is separated from the combustion zone by a heat-transmissive partition configured to transmit heat from the combustion zone to the pyrolysis zone, thereby providing at least a portion of the heat of pyrolysis. The one or more pyrolyzer gas outlets may comprise a plurality of apertures in the heat-transmissive partition. The gas mixture may thus be discharged from the pyrolysis zone to the combustion zone via the apertures.

In some embodiments, the pyrolyzer is configured to fluidise the pyrolyzable organic feed and the carbonaceous pyrolysis product in a flow of the producer gas in the pyrolysis zone. The system may comprise one or more heat exchange conduits configured to carry the combustion product gas through the pyrolysis zone, thereby heating the fluidised pyrolyzable organic feed in use.

In some embodiments, the system further comprises a second combustor configured to receive the combustion product gas discharged from the first combustor and further combust residual combustible components therein in the presence of excess oxygen.

In some embodiments, the system further comprises an energy generation unit for generating electrical energy and/or steam from heat released by combustion of the combustible components.

In some embodiments, the system further comprises a drying unit to dry the at least one carbon-containing feed and/or the pyrolyzable organic feed. Energy to the drying unit may be provided from heat released by combustion of the combustible components.

In accordance with a second aspect the invention provides a method of pyrolysis, the method comprising: feeding at least one carbon-containing feed and an oxidising gas to a gasification zone and oxidising the carbon-containing feed therein to form a producer gas; wherein a residual oxygen content in the producer gas is substantially depleted or maintained below a maximum predetermined amount by controlling a ratio of oxygen fed to the gasification zone to the carbon-containing feed; feeding the producer gas from the gasification zone to a pyrolysis zone; pyrolyzing a pyrolyzable organic feed in the pyrolysis zone in the presence of the producer gas to produce a carbonaceous pyrolysis product and a gas mixture comprising combustible components comprising pyrolysis gas; discharging the gas mixture from the pyrolysis zone into a combustion zone; feeding an oxygen-containing gas to the combustion zone; and combusting at least a portion of the combustible components present in the gas mixture in the combustion zone to form a combustion product gas.

The carbon-containing feed to the gas producer typically does not comprise the carbonaceous pyrolysis product from the pyrolyzer. In some embodiments, the method further comprises discharging at least a portion of the carbonaceous pyrolysis product from the pyrolyzer as an unoxidized product.

In some embodiments, the maximum predetermined amount is no more than 4 wt %, or no more than 2 wt %, such as no more than 1 wt %. In some embodiments the residual oxygen content of the producer gas is substantially depleted, for example to substantially zero.

In some embodiments, the oxidising gas is an oxygen-containing gas, such as air. In some embodiments, the at least one carbon-containing feed is partially oxidised such that the producer gas comprises carbon monoxide and/or hydrogen.

In some embodiments, the method comprises feeding a first contaminated solid material to the gasification zone, wherein one or more contaminants in the first contaminated solid material are vaporised and/or destroyed therein. The contaminants may include one or more fluorinated or brominated compounds, such as one or more per- and polyfluoroalkyl substances (PFAS). The first contaminated solid material may comprise biosolids, for example a fines fraction of biosolids.

In embodiments where a first contaminated material is fed to the gasification zone, the producer gas fed to the pyrolysis zone may comprise one or more vaporised products of the contaminant vaporisation and/or destruction. At least a portion of the vaporised products may be i) captured in the carbonaceous pyrolysis product and/or ii) catalytically degraded by the carbonaceous pyrolysis product. An additive, such as a source of calcium, may be added to the pyrolysis zone to react with the vaporised products, thereby capturing at least a portion of the vaporised products in the carbonaceous pyrolysis product.

In embodiments where a first contaminated material is fed to the gasification zone, one or more vaporised products of the contaminant vaporisation and/or destruction may be combusted or thermally degraded in the presence of excess oxygen in the combustion zone or in a further combustor downstream of the combustion zone.

In embodiments where a first contaminated material is fed to the gasification zone, the method may further comprise discharging a decontaminated solid material from the gasification zone.

In some embodiments, a second contaminated solid material is fed to the pyrolysis zone. One or more contaminants in the second contaminated solid material are thus vaporised and/or destroyed in the pyrolysis zone.

In some embodiments, the method further comprises: separating a feedstock, for example a biomass or waste feedstock, such as a biosolids feedstock, into first and second fractions; directing the first fraction to the gasification zone to form at least a portion of the at least one carbon-containing feed; and directing the second fraction to the pyrolysis zone to form at least a portion of the pyrolyzable organic feed. The method may further comprise: adjusting the ratio of the first fraction to the second fraction to vary a net energy output of the system.

In some embodiments, the pyrolysis zone is separated from the combustion zone by a heat-transmissive partition. At least a portion of the heat of pyrolysis may thus be provided by transmission of heat from the combustion zone to the pyrolysis zone through the partition. The heat-transmissive partition may comprise a plurality of apertures, and the gas mixture may flow from the pyrolysis zone to the combustion zone via the apertures.

In some embodiments, the pyrolyzable organic feed and the carbonaceous pyrolysis product are fluidised in a flow of the producer gas in the pyrolysis zone. In some such embodiments, the fluidising pyrolyzable organic feed is heated by one or more heat exchange conduits which carry the combustion product gas through the pyrolysis zone.

In some embodiments, the oxygen-containing gas is fed to the combustion zone in an amount sufficient to provide excess oxygen in the combustion product gas, such as at least 5 wt % oxygen.

In some embodiments, residual combustible components in the combustion product gas are further combusted with excess oxygen downstream of the combustion zone.

In some embodiments, the method further comprises generating electrical energy and/or steam from heat present in the combustion product gas or heat released by further combustion of the combustion product gas. In some embodiments, the method further comprises drying the at least one carbon-containing feed and/or the pyrolyzable organic feed with heat present in the combustion product gas or heat released by further combustion of the combustion product gas.

In some embodiments, the pyrolyzable organic feed comprises at least one selected from biomass and waste. In some embodiments, the pyrolyzable organic feed comprises biosolids. The biosolids may, for example, be a coarse fraction of biosolids.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

The present invention relates to a system for pyrolysis. The system comprises at least (i) a gas producer, (ii) a pyrolyzer and (iii) a combustor.

The gas producer comprises a gasification zone and a producer gas outlet, and is configured to oxidise at least one carbon-containing feed in the presence of an oxidising gas in the gasification zone to form a producer gas, and discharge the producer gas from the gasification zone via the producer gas outlet. The residual oxygen content of the producer gas is substantially depleted or maintained below a maximum predetermined amount by controlling a ratio of oxygen fed to the gasification zone to the carbon-containing feed.

The pyrolyzer comprises a pyrolysis zone and one or more pyrolyzer gas outlets, and is configured to feed the producer gas discharged from the gasification zone to the pyrolysis zone, pyrolyze a pyrolyzable organic feed in the pyrolysis zone in the presence of the producer gas to produce a carbonaceous pyrolysis product and a gas mixture comprising combustible components including pyrolysis gas, and discharge the gas mixture from the pyrolysis zone via the one or more pyrolyzer gas outlets.

The combustor comprises a combustion zone, and is configured to receive the gas mixture discharged from the pyrolysis zone in the combustion zone, feed an oxygen-containing gas to the combustion zone, and combust at least a portion of the combustible components present in the gas mixture in the combustion zone to produce a combustion product gas.

The invention also relates to a method of pyrolysis, which may be performed in the systems disclosed herein. The method comprises at least the following process steps: (1) feeding at least one carbon-containing feed and an oxidising gas to a gasification zone and oxidising the carbon-containing feed therein to form a producer gas, wherein a residual oxygen content of the producer gas is substantially depleted or maintained below a maximum predetermined amount by controlling a ratio of oxygen fed to the gasification zone to the carbon-containing feed; (2) feeding the producer gas from the gasification zone to a pyrolysis zone; (3) pyrolyzing a pyrolyzable organic feed in the pyrolysis zone in the presence of the producer gas to produce a carbonaceous pyrolysis product and a gas mixture comprising combustible components including pyrolysis gas; (4) discharging the gas mixture from the pyrolysis zone into a combustion zone; (5) feeding an oxygen-containing gas to the combustion zone; and (6) combusting at least a portion of the combustible components present in the gas mixture in the combustion zone to form a combustion product gas.

The disclosure that follows generally relates to both the systems and the methods of the invention.

Figure 1:
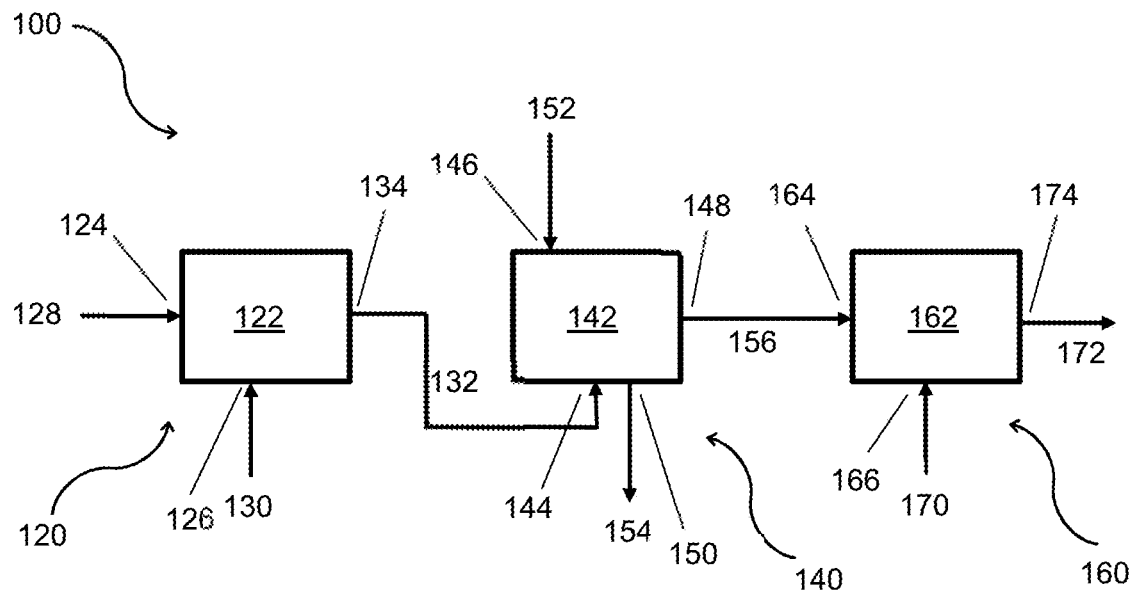
FIG. 1 schematically depicts a system for pyrolysis according to an embodiment of the invention.

Depicted in FIG. 1 is pyrolysis system 100 according to embodiments of the invention. System 100 comprises gas producer 120, pyrolyzer 140 and combustor 160. Gas producer 120 includes a reaction vessel having gasification zone 122, feed inlet 124, air inlet 126 and producer gas outlet 134. In use, carbon-containing feed 128 (which may be gas, liquid or solid) and air 130 are fed via inlets 124 and 126 respectively to gasification zone 122, where oxidisable components in the feed are partially oxidised (i.e. gasified) at conventional gasification temperatures, for example from 600° C. to 900° C., to form producer gas 132. Hot producer gas 132, comprising nitrogen, partial oxidation products such as carbon dioxide, carbon monoxide, hydrogen, methane and water, and any residual oxygen, is then discharged from gasification zone 122 via producer gas outlet 134.

The flow rate of air 130 relative to carbon-containing feed 128 can be controlled to deplete the oxygen or maintain the content of residual oxygen in producer gas 132 below a predetermined maximum threshold. In particular, the oxygen content is controlled to a level suitable to provide effective pyrolysis conditions in pyrolyzer 140. For example, the oxygen content may be controlled to below 1 wt %, or it may be depleted to substantially zero. Under partial oxidation conditions where the producer gas comprises combustible components such as carbon monoxide and hydrogen, the oxygen content in the producer gas is depleted, i.e. reduced to substantially zero.

Pyrolyzer 140 includes a reaction vessel having pyrolysis zone 142, pyrolyzer gas inlet 144, solid feed inlet 146, at least one pyrolyzer gas outlet 148 and solids outlet 150. In use, producer gas 132 from gas producer 120 is fed, typically continuously, into pyrolysis zone 142 via inlet 144. Gas 132 may be the only source of non-oxidising gas feed to pyrolysis, at least during continuous operation (i.e. post start-up). Solid pyrolyzable organic feed 152, which may be introduced initially, periodically or continuously into pyrolysis zone 142 via inlet 146, is then pyrolyzed in pyrolysis zone 142 in the presence of producer gas 132. The pyrolysis is conducted at a conventional pyrolysis temperature, such as between 250° C. and 750° C. (depending on the feed) to produce carbonaceous pyrolysis product 154 (i.e. char) and pyrolysis gas. The selectivity towards desirable pyrolytic cracking reactions, as opposed to undesirable oxidation reactions, is advantageously favoured by the low oxygen content in producer gas 132. Moreover, hot producer gas 132 provides a portion of the heat necessary to drive the endothermic pyrolysis reaction. The pyrolysis gas combines with producer gas 132 to form gas mixture 156, which is discharged from pyrolysis zone 142 via pyrolyzer gas outlet 148. High quality carbonaceous pyrolysis product 154 is discharged continuously, periodically or ultimately via solids outlet 150.

Combustor 160 includes a reaction vessel having combustion zone 162, at least one gas mixture inlet 164, air inlet 166 and combustor gas outlet 174. In use, gas mixture 156 and air 170 are fed via inlets 164 and 166 respectively to combustion zone 162, where the combustible components in the gas mixture, including the pyrolysis gas and partial oxidation products carried through from gas producer 120, combust to form combustion product gas 172. Combustion product gas 172 is discharged from combustion zone 162 via combustor gas outlet 174.

Combustor 160 and pyrolyzer 140 may optionally be integrated, as will be described in greater detail hereafter, such that the heat of combustion produced in combustion zone 162 provides the remaining portion of the heat necessary to drive the endothermic pyrolysis reaction in pyrolysis zone 142.

In some embodiments, combustor 160 is controlled to provide substantially complete combustion of all combustible products in combustion zone 162. Air 170 is thus added in excess such that combustion product gas 172 comprises substantial amounts of residual oxygen, and in particular higher amounts of oxygen than would be acceptable in gas product 132 fed to pyrolysis. Excess heat of combustion produced in combustion zone 162 may optionally be used to produce electrical power or steam by conventional means.

In other embodiments, the addition of air 170 to combustor 160 is limited such that a substantial amount of residual uncombusted (or partially combusted) combustible components are present in combustion product gas 172. For example, in embodiments where combustor 170 and pyrolyzer 140 are integrated so that the combustion reaction provides the heat of pyrolysis, the addition of air 170, and thus the degree of oxidation in combustion zone 162, may be the controllable variable used to maintain the temperature in pyrolysis zone 142 within a desired range. In this case, partially combusted product gas 172 may be sent to a further combustor (not shown) where the remaining combustible products therein are combusted to extinction in the presence of excess oxygen, optionally using the heat to generate electrical power or steam.

Advantageously, gas producer 120 provides a supply of non-oxidising gas feed to pyrolyzer 140 in a highly controllable way due to the lack of competing process constraints. This avoids the need either for a separate inert gas supply (e.g. piped nitrogen), which may not be an available resource on site, or to recycle a suitably non-oxidising gas produced by controlled combustion/gasification of the pyrolysis gas product. In the once-through system 100, combustor 160 can thus be operated effectively to achieve its primary objectives, namely one or more of i) combustion to extinction of all combustible products, ii) the production of electrical power or steam, and iii) the provision of heat needed to drive the endothermic pyrolysis reaction. Pyrolysis system 100 is thus simple and cheap to construct and operate due to the process control simplicity and the lack of recycle streams.

Furthermore, by conducting an exothermic/autothermal partial oxidation reaction in gas producer 130, the overall energy balance of the process operating in system 100 is favourable, even when solid pyrolyzable organic feed 152 is low in energy content, so that an external input of energy such as electricity or natural gas may be avoided or reduced. In some embodiments, the process is substantially energy-positive, so that excess energy may be used to generate power or steam. In embodiments where pyrolyzable organic feed 152 produces a low yield of pyrolysis gas, the presence of partial oxidation products from the gas producer may ensure that gas mixture 156 is combustible and that system 100 is energy-positive.

Moreover, a substantial amount of the carbon present in the pyrolyzable organic feed can be permanently sequestered in the carbonaceous solid material (i.e. char), thus avoiding carbon emissions. The char product is of high quality due to the non-oxidising properties of the producer gas, and may have applications in soil amendment, environmental remediation and advanced materials (e.g. for battery storage and catalysts).

In some embodiments, system 100 is used to process biosolids, for example at a wastewater treatment facility. The biosolids are thus fed as at least a portion of pyrolyzable organic feed 152 to pyrolyzer 140 where they are pyrolyzed to form sterile biochar. The biochar then leaves the process as all or part of carbonaceous pyrolysis product 154. Wastewater treatment facilities commonly have an available supply of methane-rich biogas suitable for use as carbon-containing feed 128. Alternatively, another portion of the biosolids may be used as carbon-containing feed 128, as further described below.

Figure 2:
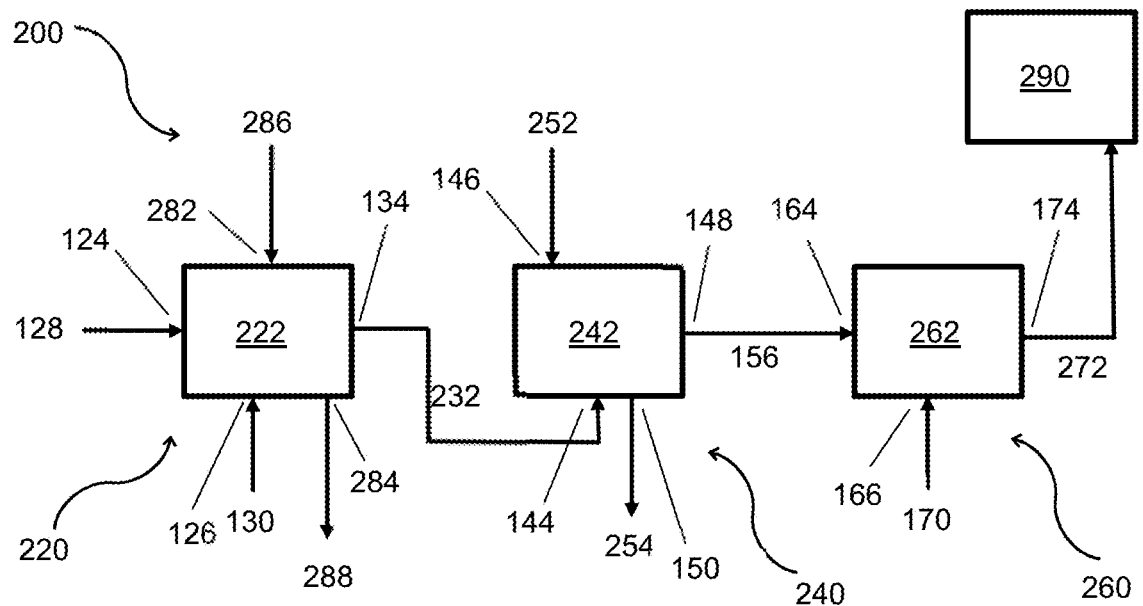
FIG. 2 schematically depicts another system for pyrolysis according to an embodiment of the invention, in which a contaminated solid material is decontaminated in the gas producer.

The pyrolysis system of the invention may also be used to decontaminate a contaminated solid material, for example a contaminated biosolids fraction. Depicted in FIG. 2 is pyrolysis system 200 according to such an embodiment. Similarly numbered items of system 200 are as described herein for system 100 depicted in FIG. 1.

In system 200, gas producer 220 includes solid material inlet 282 and solid material outlet 284. In use, contaminated solid material 286 is fed via inlet 282 to gasification zone 222. Solid material 286 may be fed continuously, periodically or only initially in a given reaction. Optionally, a carbon-containing feed 128 is also fed to the gasification zone, for example a fuel such as biogas. However, if the carbon content of material 286 is sufficient to react with air 130 and thus produce non-oxidising producer gas 232 as described above, it may be unnecessary to add a separate source of carbon-containing feed 128.

The contaminants in contaminated solid material 286 are vaporised and/or partially or completely destroyed in gasification zone 222 by oxidation or thermal degradation mechanisms. After a sufficient residence time in the gasification zone to allow decontamination in this manner, decontaminated solid material 288 may be discharged via outlet 284. The vaporised contaminants or degradation products thereof are carried out of gasification zone 222 in producer gas 232. In some embodiments, these components are then captured in the carbonaceous pyrolysis product 254 discharged from pyrolyzer 240 (after pyrolysis of pyrolyzable organic feed 152), further degraded in the pyrolysis zone (including catalytically on the carbonaceous product surface), combusted or further thermally degraded in combustor 260 (or a further downstream combustor as described herein) and/or recovered from combustion product gas 272 in a post-combustion caustic scrubber system 290.

In some embodiments, contaminated solid material 286 is contaminated with one or more fluorinated compounds or brominated compounds. For example, it may be a biosolids fraction comprising elevated levels of per- and polyfluoroalkyl substances (PFAS).

The inclusion of gas producer 220 in system 200 provides a number of further advantages in addition to those already described herein for system 100. The decontamination of solid material 286 under oxidative conditions prior to pyrolyzer 240 provides the opportunity to capture the contaminants, or oxidised degradation products thereof, in the solid carbonaceous pyrolysis product, or to catalytically degrade these products on the solid carbonaceous pyrolysis product. Furthermore, absent the constraint that a non-oxidising combustion product gas must be recycled for use in pyrolyzer 254, combustor 260 (and/or a further downstream combustor) may be operated under conditions specifically tailored to provide maximum incineration of the contaminants, for example high temperature combustion in the presence of substantial excess oxygen. For the specific example of fluorinated compounds such as PFAS, such conditions are considered necessary to activate the highly stable C—F bonds present in the molecules.

In a variation of the embodiment described with reference to FIG. 2, solid material 286 and pyrolyzable organic feed 252 are two fractions of the same feedstock, for example a biomass or biosolids feedstock. Optionally, but not necessarily, this feedstock may be contaminated, e.g. with PFAS, as described above. The process may be configured to adjust the ratio of the two feedstock fractions, so that a greater or lesser proportion is sent to gas producer 220 vs pyrolyzer 240. This allows the overall energy balance of the system to be optimised, e.g. to allow maximum production of carbonaceous pyrolysis product 254 while still remaining the overall energy balance of system 200, including net contributions from any additional process units such as feedstock drying units and additional combustion units, net positive. This may be particularly advantageous for feedstocks which can vary in their wetness or energy content.

Further details of each process unit in the systems of the invention, and the steps of the methods of the invention, will now be described.

Gas Producer and Partial Oxidation

The systems of the invention include a gas producer, a primary role of which is to produce a suitably non-oxidising gas to feed to a subsequent pyrolyzer. In embodiments of the invention where the system is used to remediate a contaminated solid material, the gas producer plays a further key role as the process unit where at least part of the decontamination is conducted.

The gas producer generally comprises at least one reaction vessel configured for oxidation of a carbon-containing feed in a gasification zone therein. The feed may be a gas (for example natural gas or biogas), a liquid (for example a hydrocarbon fuel) or a solid (for example biomass such as biosolids), and the gas producer is configured accordingly. In embodiments where solid feed(s) are oxidised and/or decontaminated in the gasification zone, the reaction vessel may be a fluidised bed or a packed bed reactor. If the carbon-containing feed is a solid, it may be the same or different from the pyrolyzable organic feed which is pyrolyzed in the subsequent pyrolyzer.

An oxidising gas is fed to the reaction vessel to oxidise the carbon-containing feed in the gasification zone. Typically, the oxidising gas will be an oxygen-containing gas, i.e. contains $O_2$, although it will be appreciated that steam is also suitable to oxidise carbon-containing feeds to produce synthesis gas. The oxidising gas is most conveniently air, but it is not excluded that other oxygen sources are used. In the case of a fluidised bed reactor, the solid feed(s) to the reactor may be fluidised in the oxidising gas, which advantageously improves mixing and heat transfer in the gas producer.

The gasification zone of the gas producer is operated at temperatures where oxidation, and in some embodiments partial oxidation, reactions of the carbon-containing feed will occur. The operating temperature may thus be between 500° C. and 1100° C., such as between 700° C. and 1000° C., for example about 900° C. During continuous operation, such temperatures may be sustained by the exothermic oxidation reactions occurring in the gasification zone, and can be limited by control of the feed flow rates as further discussed below.

Since the producer gas is sent to a subsequent pyrolysis reactor, it is required to be a suitably non-oxidising gas. In particular, the residual oxygen ($O_2$) content should be low, such as below 4 wt %, or below 2 wt %, such as below 1 wt %. Accordingly, it will be appreciated that the oxygen addition into the gasification zone, relative to the oxidisable components in the carbon-containing feed(s), should be controlled, for example in response to a measured oxygen content in the producer gas or by feeding oxygen substoichiometrically to ensure partial oxidation conditions. The oxygen addition may be controlled by regulating the mass flow rate of the oxidising feed gas (e.g. air), although it is not excluded that the oxygen content in the oxidising feed gas may instead be manipulated. Alternatively, the addition of carbon-containing feed to the reactor may be manipulated (either via adjusting a continuous flow rate, or by the timing of periodic additions) to maintain the oxygen content in the producer gas below a predetermined maximum concentration.

In some embodiments, the gas producer operates under partial oxidation reaction conditions. Partial oxidation is a form of gasification reaction in which carbon-containing species are oxidised in substoichiometric amounts of oxygen to form a range of gaseous products, including carbon monoxide, carbon dioxide, hydrogen, methane and water. The product gas of partial oxidation (also known as synthesis gas) generally is depleted of oxygen, such as oxygen contents of below 1 wt %, or below 0.5 wt %, or substantially zero. The product gas mixtures of partial oxidation are generally reducing gases due to the presence of carbon monoxide and hydrogen, and contain combustible components (e.g. the carbon monoxide and/or hydrogen).

Decontamination in the Gas Producer

In some embodiments, the gas producer is configured to receive a contaminated solid material to be destroyed or remediated therein. The contaminated solid material may comprise an organic or carbonaceous material which is itself susceptible to (partial) oxidation reactions. In such embodiments, the contaminated material may form all or part of the carbon-containing feed to the gas producer. In other embodiments, the contaminated material does not contain sufficient or any oxidisable carbon, and a separate carbon-containing material, such as biogas or natural gas, must be added so that a non-oxidising producer gas can be formed in the gas producer.

In some embodiments, the contaminated solid material is contaminated with one or more fluorinated or brominated compounds, such as per- and polyfluoroalkyl substances (PFAS). In some embodiments, the contaminated material treated in the gas producer is biosolids comprising elevated levels of PFAS, for example as produced in a waste water treatment plant.

PFAS components in the contaminated material are vaporised and partially thermally degraded in the hot gasification zone of the gas producer, so that the producer gas comprises vaporised PFAS and a variety of gaseous fluorinated degradation products such as short chain PFAS, other small fluorinated organic compounds, HF and alkali fluorides. These materials can then be mineralised in the biochar product of pyrolysis, further degraded in the pyrolyzer or combustor or recovered and further processed in a downstream scrubber system, as will be described below.

In other embodiments, the contaminated solid material is contaminated with hydrocarbons. For example, it may be a soil contaminated with heavy crude oil. The hydrocarbons are vaporised and/or (partially) oxidised in the gas producer's gasification zone. The resulting vaporised hydrocarbons or oxidation products are then carried into the pyrolysis reactor with the producer gas, where they are either carbonised to form part of the solid pyrolysis product or carried further into the combustor for combustion.

Residual solid material, substantially depleted of the initial contaminants in the gasification zone, is discharged from the gas producer after a suitable residence time. The inventors have found that PFAS-contaminated biosolids can be remediated in a gas producer such that the PFAS is virtually undetectable in the residual solids.

Pyrolyzer

The systems according to the invention include a pyrolyzer for pyrolyzing a solid organic feed. The pyrolyzer generally comprises at least one reaction vessel configured for pyrolysis of a solid feed in a pyrolysis zone therein. In use, the solid feed is introduced to the pyrolysis zone where it is heated in the presence of the non-oxidising producer gas fed from the gas producer, which provides a suitable environment for pyrolytic cracking reactions to occur. Due to the low oxygen content (and, in partial oxidation embodiments, the reducing character) of the producer gas fed from the gas producer, a high quality solid carbonaceous material (char) is produced in the pyrolyzer. Moreover, at least a portion of the heat of pyrolysis may be supplied by the hot producer gas.

In some embodiments, the pyrolyzer is configured to fluidise the pyrolyzable organic feed and resultant carbonaceous pyrolysis product in a flow of the producer gas, i.e. the pyrolyzer is a fluidised bed reactor. This arrangement advantageously improves heat transfer from the hot producer gas to the pyrolyzing feedstock and mixing of the feed and products in the pyrolysis zone. The fluidised bed configuration thus facilitates the endothermic pyrolysis reactions and ensures that a good quality char product is formed. The flow of producer gas from the gas producer into the pyrolysis zone may also contribute to a positive pressure differential between the pyrolysis zone and the downstream combustion zone. This may advantageously favour forward flow of the pyrolysis gas mixture into the combustor while preventing or substantially limiting an unwanted reverse flow of oxidising gases from the combustor into the pyrolyzer.

The invention is applicable to a wide range of solid pyrolyzable organic feeds, including 1) waste such as plastics, tyres or any other solid hydrocarbon-containing waste or their blends; 2) biomass such as wood, straw, rice husk, coffee husk and any other type of biomass materials; 3) contaminated soils; 4) dried algae; 5) biosolids or sewage sludge; 6) food waste; 7) any type of solid organic or inorganic human waste; 8) biomass waste such as green waste, agricultural residue, paunch waste or their blends and 9) hybrid inorganic and organic waste such as municipal solid waste. For the avoidance of doubt, the term "pyrolyzable organic feed" as used herein refers to any feed that contains at least a portion of an organic, carbon-containing material from any source, including synthetic, mineral and bio-based sources, that can be pyrolyzed to produce pyrolysis products.

In some embodiments, the pyrolyzable organic feed is selected from biomass (including biosolids) and waste. The process may be particular relevant for such feeds due to the incentives to sequester a portion of the carbon content in a stable solid product and to off-set processing costs by producing value-added char products. Moreover, by using an exothermic/autothermal gas producer in combination with the endothermic pyrolyzer, the process can accommodate a range of biomass feestocks with low energy content and high moisture content. In some embodiments, the pyrolyzable organic feed contains water, for example a water content of at least 30 wt. %, or at least 50 wt. %.

Industrial pyrolysis reactions are typically performed at 350-750° C., depending on the feed and the target products, and the pyrolysis zone of the pyrolyzer may be suitably configured to operate in this temperature range. Pyrolysis reactions generally produce a mixture of products, which on cooling include solid carbonaceous products (char), an oil (condensable) fraction and a gas (non-condensable) fraction. The fractions of gas, oil and char produced as primary products in a pyrolysis process vary with the heating rate, temperature and feedstock, and pyrolysis process may be classified accordingly into three process types: slow pyrolysis, fast pyrolysis and flash pyrolysis. Slow pyrolysis generally produces more char, fast pyrolysis produces more oil fraction and flash pyrolysis produces more gas fraction. It will be appreciated that the oil product fraction of the pyrolysis reaction is substantially in vapour form when produced at the high reaction temperature in the pyrolysis zone. Accordingly, where the present disclosure refers to the production of "pyrolysis gas", or its further reaction by combustion, the "pyrolysis gas" is to be understood to include both the non-condensable gas fraction and the vaporised (but condensable) oil fraction.

The selected reaction temperature in the pyrolysis zone may depend on the nature of the pyrolyzable organic feed. Where the feed is a waste plastic, for example, a relatively low temperature, such as 250° C. to 400° C., may be appropriate. Where the feed is biomass, for example biosolids derived from sewage, a relatively higher reaction temperature, such as 400° C. to 750° C., may be preferred.

The pyrolyzable organic feed may be added continuously, periodically or initially to the pyrolysis zone. For commercial-scale processes, it will generally be added continuously or periodically so that a relatively constant production rate of pyrolysis gases is obtained. Suitable residence times of solids in the pyrolysis chamber may be from 10 minutes to one hour, for example 25 to 30 minutes. Suitable pressures in the pyrolysis chamber may be between 1 and 10 bar, for example between 1 and 3 bar.

Pyrolysis is an endothermic reaction, and thus requires an input of energy, i.e. the heat (or enthalpy) of pyrolysis. A portion of the required energy may be obtained from the producer gas, which carries heat produced by the exothermic oxidation reactions taking place in the gas producer. In some embodiments, a portion of the required energy input is provided by combustion of the combustible components (including the pyrolysis gas product) in the gas mixture sent from the pyrolyzer to the combustor. The pyrolyzer and the combustor may thus be thermally integrated as will be described in greater detail hereafter.

The pyrolysis gas produced in the pyrolysis zone combines with the producer gas introduced into the pyrolysis zone to form a gas mixture. This gas mixture comprises both inert components (such as $N_2$) and combustible components including the pyrolysis gas product and any combustible partially oxidised components formed in the gas producer. The gas mixture is discharged from the pyrolysis zone and sent to the combustor, as will be described hereafter.

The pyrolysis process produces a carbonaceous pyrolysis product, also known as char (or biochar in the case of biomass feedstocks) which is typically taken as a final product of the process. Char is a particularly desirable product for many biomass and waste pyrolysis applications, both because of its value in applications such soil amendment, soil remediation and water purification, and because carbon in the process feedstock is thus sequestered in a stable solid form rather than emitted as carbon dioxide. The carbonaceous pyrolysis product is thus typically not oxidised in either the combustor or the gas producer. The properties of pyrolysis char will depend on the nature of the feedstock and the pyrolysis conditions, but a typical carbonaceous pyrolysis product is a porous solid with a high surface area, for example a BET surface area of greater than 20 $m^2/g$, or in the range of 30 to 100 $m^2/g$.

Treatment of Contaminants in the Pyrolyzer

In some embodiments of the invention, as already described, a contaminated solid material is treated in the gas producer such that the contaminants, or degradation products thereof, are vaporised and carried to the pyrolyzer in the producer gas. These vaporised materials may simply pass through the pyrolysis zone and thus on to the combustor for further degradation under the high temperature/strongly oxidising conditions in the combustion zone. In some embodiments, however, the vaporised materials are at least partially further degraded or reacted in the pyrolysis zone. For example, it is believed that further degradation reactions of PFAS compounds may be catalysed on the surface of the carbonaceous pyrolysis product in the pyrolysis zone. In some embodiments, the contaminants or their degradation products may be captured in the carbonaceous product of pyrolysis, preferably in a non-harmful form. For example, where the vaporised contaminants include degradation products of fluorinated contaminants (such as PFAS), a source of calcium may be added to the pyrolysis zone (e.g. together with the pyrolyzable organic feed) to mineralise a portion of the fluorine as $CaF_2$.

In some embodiments, the solid organic feed to pyrolysis may itself be contaminated, for example with PFAS. The solid feeds to the gas producer and pyrolysis may be two fractions of the same feedstock. For example, a highly contaminated biosolids fraction (e.g. a fines fraction) may be sent to the gas producer while a less contaminated fraction is the primary source of pyrolyzable feed in pyrolysis. The contaminants in the solid pyrolyzer feed may be vaporised and/or thermally degraded in the high temperature pyrolysis zone, captured in the carbonaceous combustion product, or carried out of the pyrolysis zone in the gas mixture for further degradation in the downstream combustor.

Combustor

The systems of the invention include at least one combustor, which generally comprises at least one reaction vessel configured for at least partial combustion of a combustible gaseous feed in a combustion zone therein. The gas mixture discharged from the pyrolysis zone is sent to this combustion zone for at least partial combustion of the combustible components therein, and a combustion product gas is then discharged from the combustor.

The gas mixture from pyrolysis may be the only source of combustible products introduced to the combustor, at least during continuous operation (i.e. post start-up). Indeed, the overall process may desirably be configured and operated to ensure that an external energy input is not required during continuous operation. Optionally, however, the combustor may be configured to feed and combust another fuel source (for example natural gas or biogas). This may be particularly useful during start up to achieve suitable temperatures in the combustor or pyrolyzer.

An oxygen-containing gas is fed to the combustion zone to combust at least a portion of the combustible components therein. The oxygen-containing gas is most conveniently air, but it is not excluded that other oxygen sources are used. The oxygen-containing gas may be pre-heated, for example by indirect contact with the hot flue gases, for thermal efficiency.

The combustion zone of the combustor is operated at temperatures where combustion reactions of the combustible components in the gas mixture will occur. The operating temperature may thus be between 700° C. and 1300° C., or between 700° C. and 1100° C., such as between 800° C. and 1000° C., for example about 900° C. During continuous operation, such temperatures may be sustained by the exothermic oxidation reactions occurring in the combustion zone.

In some embodiments, the combustor is operated to provide substantially complete combustion of all combustible products in the combustion zone. Oxygen is thus added in excess, and high combustion temperatures may be favoured. Sufficient oxygen may be added such that the combustion product gas contains at least 5 wt % oxygen, or at least 10 wt % oxygen. Such conditions favour high conversion of the combustible products and moreover may advantageously further degrade contaminants carried over from the gas producer and pyrolyzer. Excess heat of combustion produced in the combustion zone may be used to produce electrical power or steam. This may be done using a heat exchanger inside or otherwise thermally coupled to the combustion zone, or it may be done downstream of the combustor using heat carried in the discharged combustion gas.

In other embodiments, the combustor is operated to provide only partial combustion of the combustible components fed to the combustion zone. The oxygen supply may be limited such that a substantial amount of residual uncombusted (or partially oxidised) components are present in the combustion product gas. This arrangement may be preferred when the combustor and the pyrolyzer are thermally integrated. The degree of combustion is thus controlled by regulating the oxygen feed so as to maintain the temperature in the pyrolysis reactor within a target range. Residual combustible products in the combustion product gas may be combusted downstream of the combustor, as will be described hereafter.

Integrated Pyrolyzer and Combustor

In some embodiments, the pyrolyzer and the combustor are thermally integrated so that the heat of combustion provides a portion of the heat of pyrolysis. The pyrolysis zone and the combustion zone may thus be separated by a heat-transmissive partition which allows heat flow from the combustion zone, operated at a higher temperature, to the pyrolysis zone, operated at a lower temperature. The partition may either be impermeable or comprise a plurality of apertures, as will be described hereafter.

Figure 3:
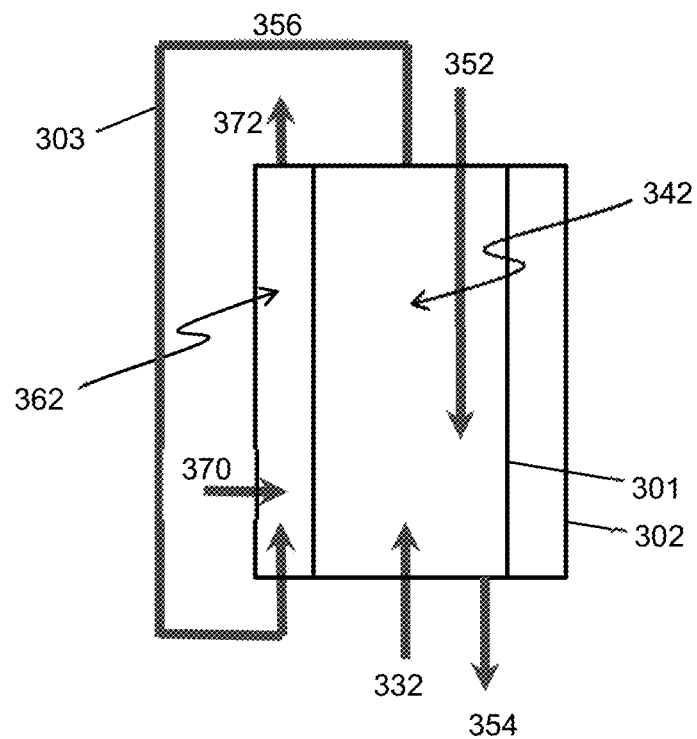
FIGS. 3 and 3A schematically depict side and plan views of an integrated pyrolyzer and combustor in a system for pyrolysis according to another embodiment of the invention.
Figure 3A:
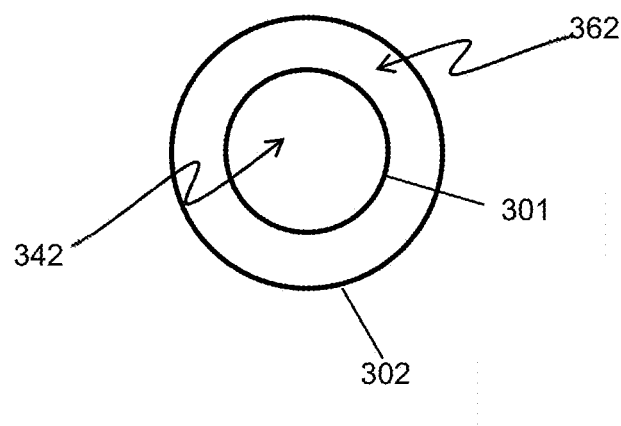

Depicted in FIGS. 3 and 3A is an integrated pyrolyzer-combustor according to embodiments of the invention. The pyrolyzer comprises pyrolysis zone 342, configured to receive a pyrolyzable organic feed 352 and producer gas 332 from a gas producer as described herein. The combustor comprises combustion zone 362 adjacent to pyrolysis zone 342, with impermeable metal partition 301 defining a boundary between the pyrolysis and combustion zones. The pyrolysis zone is cylindrical, and the combustion zone is an annulus between outer walls 302 and cylindrical partition 301, as schematically depicted in side view in FIG. 3 and in plan view in FIG. 3A.

In use, organic feed 352 and producer gas 332 are fed to pyrolysis zone 342. Optionally, the solid feed is fluidised in the producer gas. The organic feed pyrolyzes at a temperature of between 350° C. and 750° C. to produce pyrolysis gas and solid carbonaceous pyrolysis products, and carbonaceous products 354 are discharged from pyrolysis zone 342 after a suitable residence time. The pyrolysis gas combines with the producer gas to form gas mixture 356, which is discharged from the pyrolysis zone and transported by external pipework 303 to combustion zone 362. There, the combustible components in the gas mixture are at least partially combusted with the oxygen introduced in air feed 370. Combustion product gas 372 is discharged from the combustion zone and may be sent on to a further combustor, energy recovery or post-combustion processing as described herein. A portion of the heat of combustion is transferred from combustion zone 342 through metallic partition 301 by conduction, thereby driving the endothermic pyrolysis reaction in pyrolysis zone 342.

Figure 4:
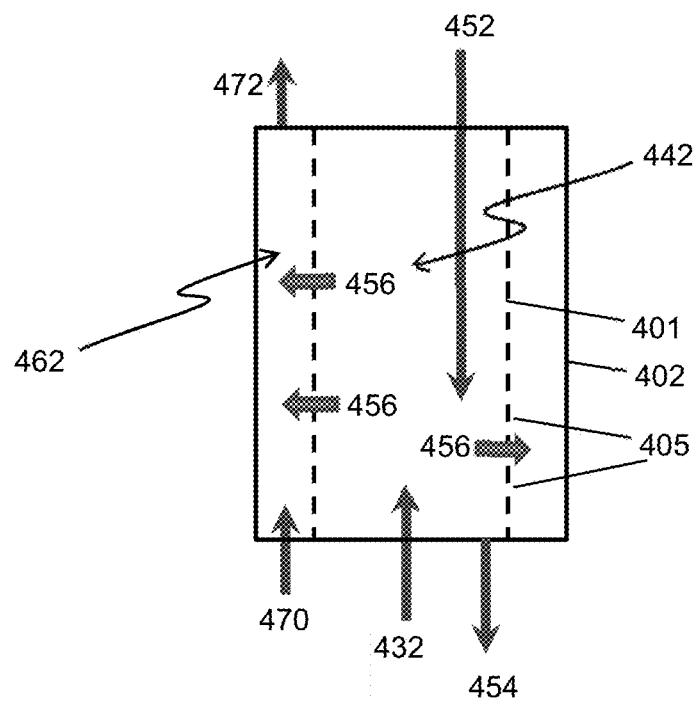
FIGS. 4 and 4A schematically depict side and plan views of an integrated pyrolyzer and combustor in a system for pyrolysis according to an embodiment of the invention.
Figure 4A:
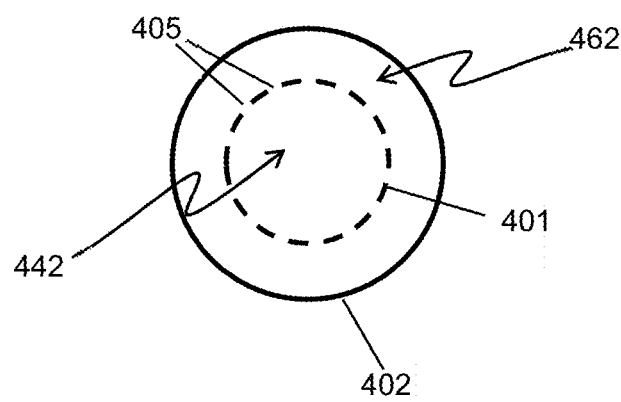

Depicted in FIGS. 4 and 4A is an integrated pyrolyzer-combustor according to other embodiments of the invention. The pyrolyzer comprises pyrolysis zone 442, configured to receive a pyrolyzable organic feed 452 and producer gas 432 from a gas producer as described herein. The combustor comprises combustion zone 462 adjacent to pyrolysis zone 442, with heat-transmissive metal partition 401 defining a boundary between the pyrolysis and combustion zones. The pyrolysis zone is cylindrical, and the combustion zone is an annulus between outer walls 402 and cylindrical partition 401, as schematically depicted in side view in FIG. 4 and in plan view in FIG. 4A. Partition 401 is preferably made of a thermally conductive material (typically metal) and includes a plurality of apertures 405 providing fluid communication between the pyrolysis zone and the combustion zone.

In use, organic feed 452 and producer gas 432 are fed to pyrolysis zone 442. Optionally, the solid feed is fluidised in the producer gas. The organic feed pyrolyzes at a temperature of between 350° C. and 750° C. to produce pyrolysis gas and solid carbonaceous pyrolysis products, and carbonaceous products 454 are discharged from pyrolysis zone 442 after a suitable residence time. The pyrolysis gas combines with the producer gas to form gas mixture 456, which is discharged from the pyrolysis zone by flowing through apertures 405 into combustion zone 462. There, the combustible components in the gas mixture are at least partially combusted with the oxygen introduced in air feed 470. Combustion product gas 472 is discharged from the combustion zone and may be sent on to a further combustor, energy recovery or post-combustion processing as described herein.

Partition 401, and in particular the distribution and size of apertures 405 therein, is configured such that a pressure differential is maintained between pyrolysis zone 442 and combustion zone 462. The resulting flow velocity of the gas mixture through the apertures is sufficient to prevent or suitably limit ingress of oxygen from the combustion zone into the pyrolysis zone. Apertures 405 are also typically small enough, or arranged above the bed of solids in the pyrolyzer, to avoid transport of solid particles from pyrolysis zone 442 to combustion zone 462.

As a result of a higher temperature maintained in the combustion zone, heat is transferred through partition 401 from combustion zone 462 to pyrolysis zone 442. The heat transfer occurs both by conduction through the thermally conductive partition material and by convection through apertures 405, thereby providing a portion of the heat necessary to drive the endothermic pyrolysis reaction in the pyrolysis zone. The degree of combustion in combustion zone 462 may be controlled to regulate the temperature in the pyrolysis zone. For example, the control may be responsive to a temperature measured in the endothermic pyrolysis zone, so as to maintain a constant or range-bound reaction temperature. In practice, the temperature in the combustion zone may be greater than that in the pyrolysis reaction zone by about 50 to 300° C., or 100 to 200° C.

Heat transfer through partition 401 is highly efficient as a result of the combined convective and conductive heat transfer modes. Moreover, the heat of combustion transferred from the combustion zone to the pyrolysis zone is generally sufficient to provide the heat of pyrolysis, such that an external energy input into the process is not required. Other benefits such as reduced weight and cost, for example via use of a simple mesh partition, are also envisaged. The complexity and/or operability of the pyrolysis system may also be improved, since hot, unstable pyrolysis gas need not be piped externally from the pyrolysis zone to the combustion zone.

Integrated pyrolyzer-combustor reactions systems have been described in greater detail in the applicant's co-pending PCT application PCT/AU2019/050548, which is hereby incorporated by reference. The pyrolyzer and combustor of the present invention may be configured and operated according to any of the embodiments disclosed therein.

When the pyrolyzer is a fluidised bed, the combustion zone may be extended via heat transfer tubes or other conduits that directs the hot flue gas through the fluidised bed in the pyrolysis zone. This arrangement provides higher heat transfer surface area (through the tubes) between pyrolysis and combustion zones and thus improves the overall heat integration between the pyrolysis and combustion reactions. The heat transfer mode in this case may be dominated by an additional particle convection term (other than gas convection, radiation and conduction) at moderate temperatures. The higher heat transfer from the particle convection term is mainly attributed to the increased particle movement across the heat transfer wall (i.e. tubes).

Figure 7:
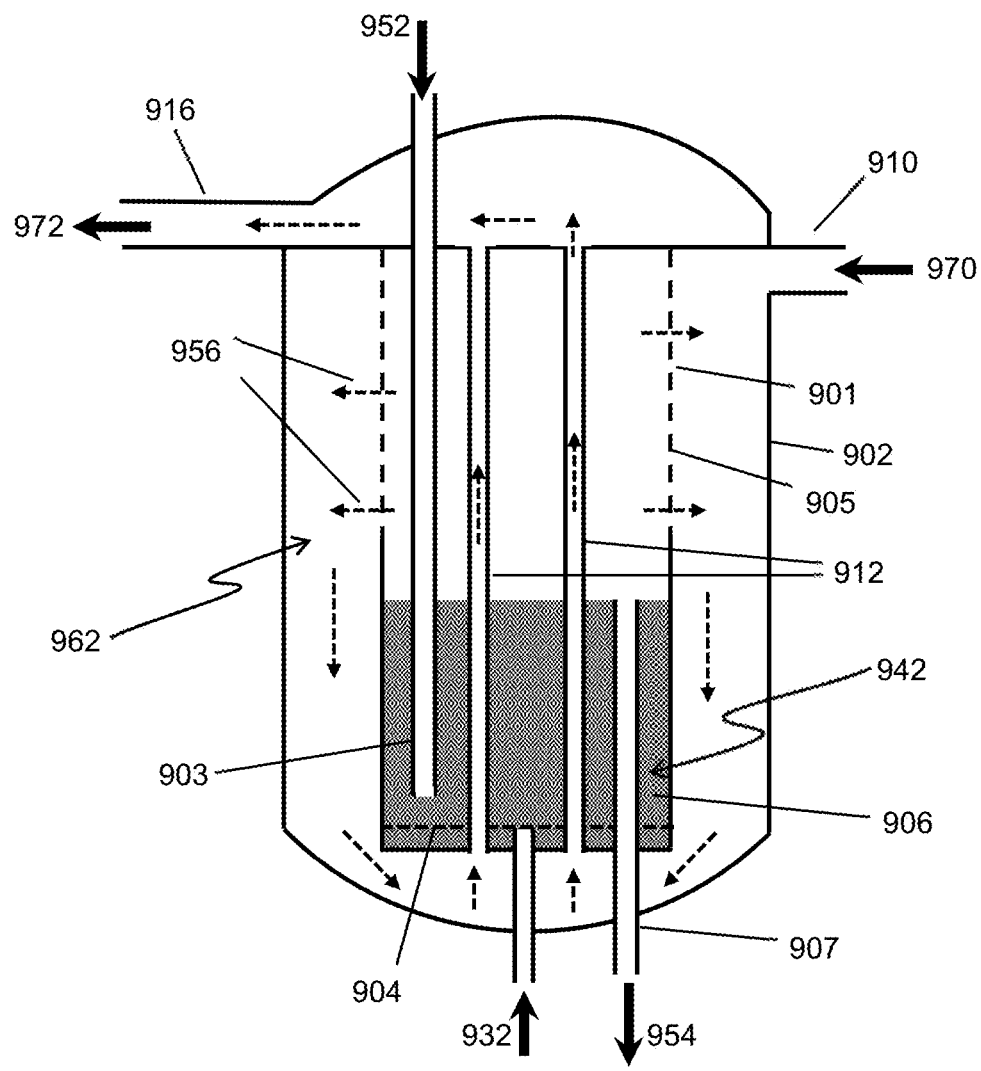
FIGS. 7 and 7A schematically depict side and plan views of an integrated pyrolyzer and combustor in a system for pyrolysis according to another embodiment of the invention.
Figure 7A:
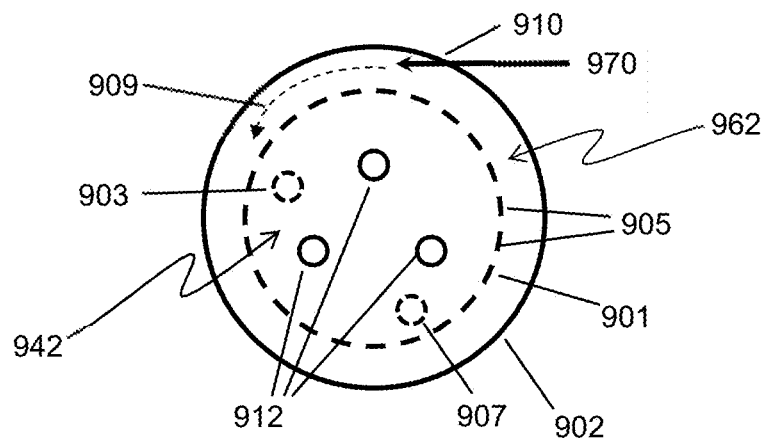

Depicted in FIGS. 7 and 7A is an integrated pyrolyzer-combustor according to such an embodiment of the invention. The pyrolyzer comprises pyrolysis zone 942, configured to receive a pyrolyzable organic feed 952 via feed line 903 and fluidise this feed and the resultant char product in producer gas 932 from a gas producer as described herein. Producer gas 932 is distributed through distributor plate 904 so that the solids are fluidised in bed 906. After a suitable residence time, char product 954 is discharged via discharge line 907.

The combustor comprises combustion zone 962 adjacent to pyrolysis zone 942, with heat-transmissive metal partition 901 defining a boundary between the pyrolysis and combustion zones. The pyrolysis zone is cylindrical, and the combustion zone is an annulus between outer walls 902 and cylindrical partition 901, as schematically depicted in side view in FIG. 7 and in plan view in FIG. 7A. Partition 901 is preferably made of a thermally conductive material (typically metal) and includes a plurality of apertures 905 in the top section of the partition providing fluid communication between the pyrolysis zone and the combustion zone. Air 970 is fed to the combustor via air inlet 910. As seen in FIG. 7A, inlet 910 is configured to feed a jet of air 970 tangentially into annular combustion zone 962. Thus, in use, a cyclonic or vortex-like flow is created adjacent outer walls 902, as depicted by arrow 909. The combustion reaction in combustion zone 962 may thus primarily take place close to outer walls 902, and thus removed from partition 901. The integrated reaction system includes a plurality of heat transfer tubes 912 which direct the hot combustion flue gases from combustion zone 962 through fluidised bed 906 in pyrolysis zone 942 and eventually out of the reactor system via outlet port 916 as combustion product gas 972. Three such tubes are depicted in spaced apart configuration in FIG. 7A, but it will be appreciated that one, two or more than three tubes may be used.

In use, organic feed 952 and producer gas 932 are fed to pyrolysis zone 942, and the solid feed is fluidised by the producer gas in fluid bed 906. The organic feed pyrolyzes at a temperature of between 350° C. and 750° C. to produce pyrolysis gas and solid carbonaceous pyrolysis products, and carbonaceous products 954 are discharged from pyrolysis zone 942 via discharge line 907 after a suitable residence time. The pyrolysis gas combines with the producer gas to form gas mixture 956, which is discharged from the pyrolysis zone by flowing through apertures 905 into combustion zone 962. There, the combustible components in the gas mixture are at least partially combusted with the oxygen introduced in air feed 970. The hot combustion gases flow downwards in the combustion zone (in a vortex flow), then up through heat transfer tubes 912 and out via outlet port 916 (see dotted arrows in FIG. 7). Combustion product gas 972 may be sent on to a further combustor, energy recovery or post-combustion processing as described herein.

Heat from the combustion reaction is thus transferred to the pyrolysis zone both through partition 901 and through the walls of transfer tubes 912. The heat transfer occurs by conduction through the thermally conductive partition and tube materials, by convection through apertures 405 and by an additional particle convection term as described herein. A portion of the heat necessary to drive the endothermic pyrolysis reaction (supplementing heat already present in the producer gas 932) in thus provided with excellent heat transfer efficiency in the pyrolysis zone.

In a further variation of an integrated pyrolyzer-combustor, pyrolysis is conducted in a plurality of heat exchange tubes which are spaced apart, arranged vertically and pass through a combustion zone. The pyrolyzable organic feed is fluidised in the heat exchange tubes by an upward flow of producer gas. The heat exchange tubes comprise tube walls (which constitute heat-transmissive partitions) having a plurality of apertures, preferably above the level of the fluidised bed, through which the mixture of pyrolysis gas and producer gas flow into the combustion zone for combustion of a portion of the pyrolysis gases. This shell and tube type arrangement of combustor and pyrolysis zones provides excellent heat-integration between the combustion and pyrolysis reactions.

Downstream Processing

The combustion product gas from the combustor may be processed in one or more downstream process units. As will be appreciated, the downstream process design may be configured differently depending on the composition of the combustion product gas.

In some embodiments, as already disclosed herein, the product gas of the primary combustor may be only partially combusted, so that it contains residual combustible components. In this case, the combustion product gas may be sent to a further combustor, which may be operated with excess oxygen and at high temperatures. This ensures complete combustion of combustible components and optimum degradation of any remaining contaminants, and their partial degradation products, present in the combustion product gas from the primary combustor. Complete combustion in this manner also prevents emissions of uncombusted compounds and provides the opportunity to recover maximum energy content from the process.

The combustion product gas, either directly from the primary combustor or from further downstream combustors, may be sent to an energy generation unit of conventional design. The energy may be used to generate electrical power and/or utility steam. In other embodiments, the combustion product gas is used to pre-heat the feeds to the pyrolyzer and/or the gas producer, for example to dry them (water removal). For biomass feedstocks, such as biosolids, the removal of water is a significant energy debit to the overall process energy, and is may thus be an important design consideration to ensure that there is sufficient heat in the combustion product gases (after the successive exothermic gas producer, endothermic pyrolysis and exothermic combustion units) to dry the biomass feedstock.

The combustion product gas may be sent to a post-combustion capture system. For example, the flue gas may be treated in an alkaline scrubber, where contaminants and degradation products, including residual PFAS, may be recovered.

Remediation of PFAS-Contaminated Biosolids

The systems and methods of the invention are considered particularly applicable in the treatment and remediation of biosolids, for example in a waste water treatment plant.

An embodiment of the invention will now be described with reference to FIG. 5, which depicts system 500 for processing PFAS-contaminated biosolids. PFAS-contaminated biosolids 501 is initially sent through dryer 502, where it is indirectly heated using hot combustion product gas 572 to effect the drying. Biosolids 501 may have a water content of up to about 75%, or even higher, before drying. Dried biosolids 503 is then comminuted in pin-mill grinder 504 to particulate form. Comminuted biosolids 505 is then classified in sieve shaker 506 into biosolids fines fraction 586 and coarse particle fraction 552. The fines fraction of biosolids comprises a higher fraction of clay than the coarse fraction, which is richer in silica. Clay has higher adsorption properties for hydrocarbons as well as cationic properties. Therefore, anionic PFAS contaminants (and also other anionic salt contaminants and hydrocarbon contaminants) aggregate disproportionately in the fines fractions of biosolids. Accordingly, the contaminated fines fraction 586 is directed to gas producer 520 while the less-contaminated large-particle fraction 552 is sent to pyrolyzer 540 as the source of pyrolyzable organic feed. In some embodiments, the ratio of fraction 586 relative to fraction 552 may be adjusted so as to vary the net energy output of system 500.

In gas producer 520, the carbon-containing organic material present in the biosolids fines fraction is partially oxidised in gasification zone 522 by air feed 530, provided by air blower 512. The organic content of the dried biosolids is generally sufficient such that the oxygen ($O_2$) in air 530 is substantially depleted during continuous operation at suitably high steady state temperatures, for example about 900° C. However, fuel 528 (for example natural gas or methane-rich biogas) is available when starting up the process, or as needed during continuous operation, as an additional carbon-containing feed source to be oxidised in burner 509 of gas producer 520. The relative flow rates of air 530 and the carbon sources (fines fraction 586 and fuel 528) are adjusted to provide a desirable flow rate of oxidised producer gas 532 and a suitably low oxygen content therein, typically less than 1 wt %, or substantially zero.

At the high reaction temperature in gasification zone 522, the PFAS contaminants in biosolids fines fraction 586 are vaporised and/or degraded, and thus carried out of gas producer 520 in producer gas 532. It has been found by experiment that C6 and C8 PFAS may be substantially depleted from contaminated biosolids in this manner. After a sufficient residence time in gasification zone 522 to allow gasification of the organic content and vaporisation or the PFAS contaminants, decontaminated solid residue 588 is discharged from the gas producer.

Producer gas 532 containing vaporised PFAS and PFAS degradation products is then fed into pyrolysis zone 542 of pyrolyzer 540, where it provides a suitably non-oxidising atmosphere conducive to pyrolysis reactions. At the steady state temperature maintained in pyrolysis zone 542, for example about 700° C., biosolids fraction 552 is pyrolyzed to form solid biochar and pyrolysis gas (including both condensable and non-condensable components). A portion of the contaminants present in biosolids fraction 552 may also be vaporised and/or thermally destroyed at the elevated temperature in the pyrolysis zone. Optionally, a source of calcium (such as lime) is added to the pyrolyzer, for example mixed together with biosolids feed 552. It is believed that a portion of the fluorine in the PFAS may be mineralised as $CaF_2$ and thus captured in the biochar. After a suitable residence time, biochar 554 is discharged from the pyrolyzer.

Gas mixture 556, comprising both the pyrolysis gas product and the non-oxidising producer gas 532, is then fed to combustion zone 562 of combustor 560. There the pyrolysis gas and partial oxidation products from the gas producer combust at a high steady state temperature, e.g. about 900° C., in the presence of excess oxygen, fed in pre-heated air feed 570. Air feed 570 is preheated in heat exchanger 513 by indirect contact with hot combustion product gas 572. The high reaction temperatures and excess oxygen in combustion zone 562 are conducive to substantially complete combustion of organic components as well as further oxidative destruction of the PFAS contaminants present in gas mixture 556.

Combustor 560 and pyrolyzer 540 are integrated as already described herein, such that the heat of combustion produced in combustion zone 562 efficiently drives the endothermic pyrolysis reaction in pyrolysis zone 542. Accordingly, during continuous operation of the system, gas mixture 556 flows through a plurality of apertures in heat-transmissive partition 507 which separates pyrolysis zone 542 from combustion zone 562. During start-up (or if needed to balance the energy requirements during continuous operation), burner 508 combusts fuel 529 (for example natural gas or methane-rich biogas) in the presence of air feed 510, thereby providing the necessary operating temperatures in the pyrolyzer and combustor.

Hot combustor flue gas 572, containing a relatively high residual oxygen content (such as about 12 wt %), PFAS decomposition products and remaining vaporised PFAS, is then sent to dryer 502, where it provides the thermal energy required to dry biosolids feed 501, and then on to energy generation unit 511 where any residual heat content is used to generate electricity and/or utility steam in conventional manner. The flue gas then passes through heat exchanger 513 and is sent to venturi caustic scrubber 514 where PFAS decomposition products (and any remaining PFAS) are recovered in the circulating alkaline solution 515. Caustic 516 is added as needed to the scrubber circuit to maintain alkalinity. The scrubbed flue gas is directed by fan 517 through activated carbon bed 518 and then vented.

System 500 may be operated to minimise or avoid the need for external energy input via fuels 528 and 529, particularly during continuous (post-start-up) operation. One approach to this end is to vary the mass ratio of biosolids fraction 586 sent to gas producer 620 relative to biosolids fraction 532 sent to pyrolyzer 640. If biosolids feedstock 501 has a high water content, for example, the overall energy balance of process 500 is negatively affected due to the energy consumption required to vaporise the water content. To address this, a greater proportion of the feedstock may be directed to the exothermic gas producer 620, to ensure that the overall process is at least thermally self-sustaining. Conversely, if biosolids feedstock 501 has a lower water content, a greater proportion of the feedstock may be directed to the endothermic pyrolyzer 620, and thus converted to biochar 554.

Figure 5:
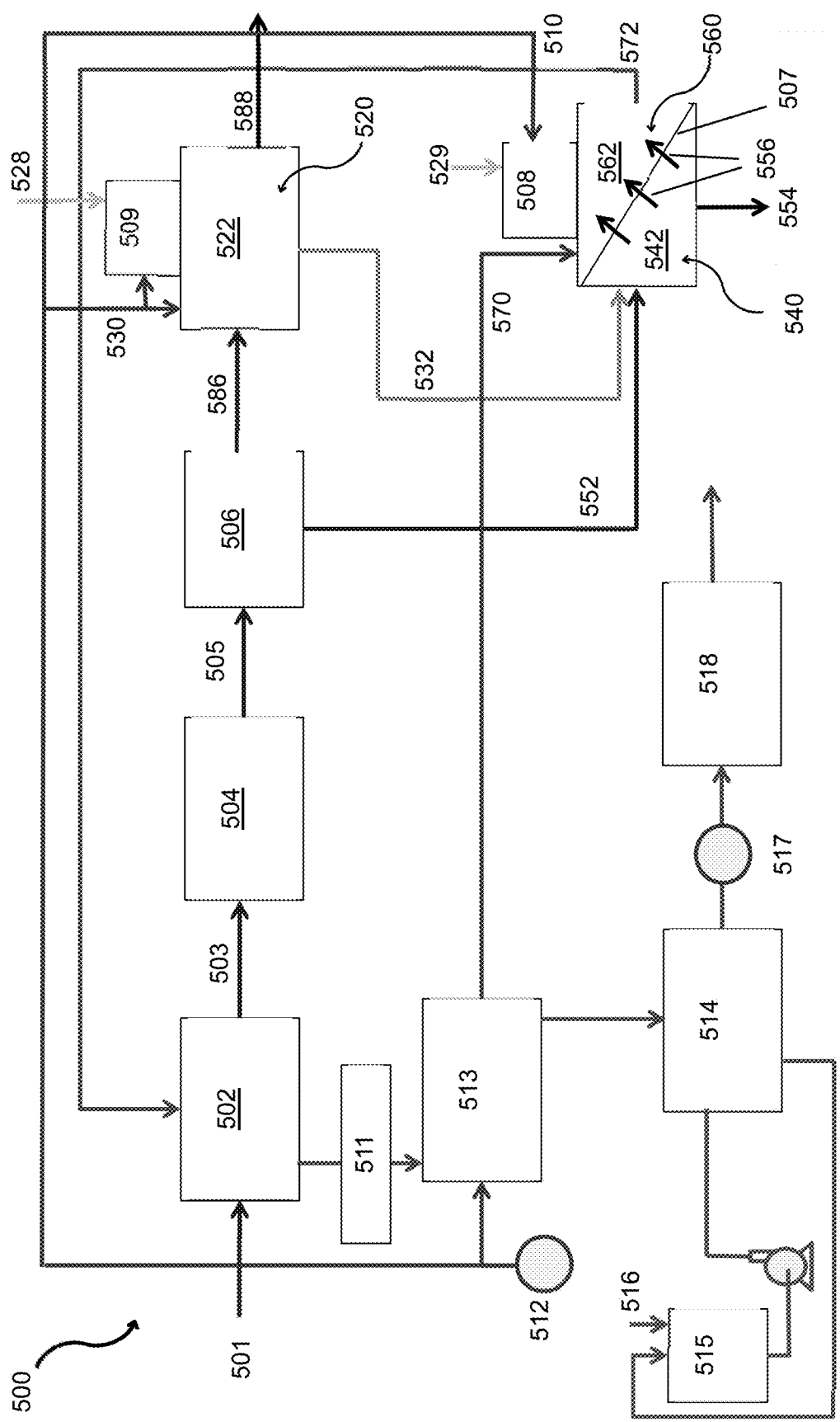
FIG. 5 schematically depicts a system for remediation and pyrolysis of PFAS-contaminated biosolids according to an embodiment of the invention.
Figure 6:
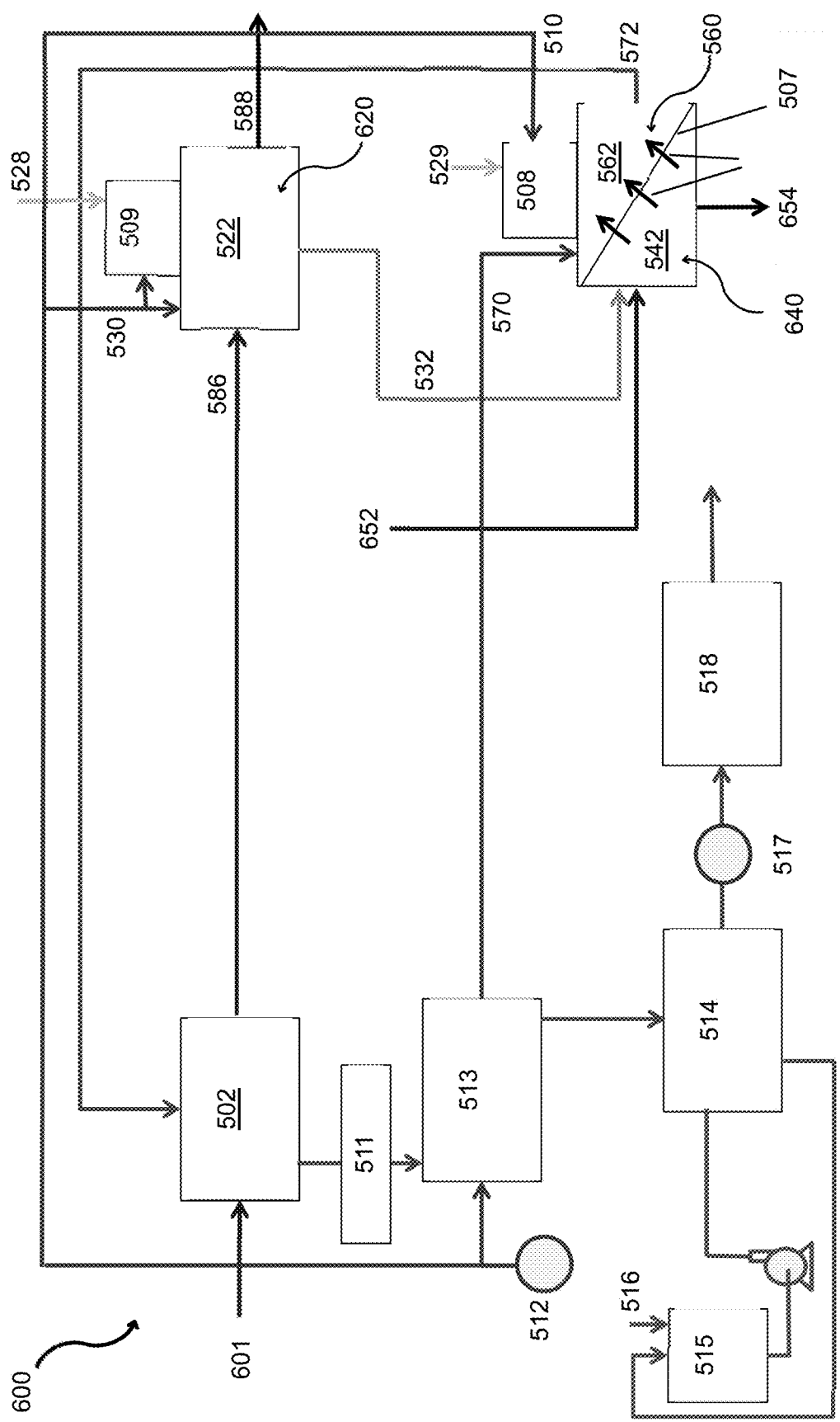
FIG. 6 schematically depicts a system for remediation of PFAS-contaminated biosolids and pyrolysis of another organic feed according to an embodiment of the invention.

A related embodiment of the invention is shown in FIG. 6. Similarly numbered items of system 600 are as described herein for system 500 depicted in FIG. 5. In system 600, however, PFAS-contaminated biosolids 601 are dried and then sent without grinding or classification to gas producer 620 only. A different source of biomass, preferably uncontaminated, is fed as pyrolyzable organic feed 652 to pyrolyzer 640 where it is converted to biochar 654. Is has been found by simulation that the overall energy balance allows generation of energy when using feeds of 4 and 6 tonnes per day of contaminated biosolids and uncontaminated biomass (such as rice husks) as feeds 686 and 652 respectively.

EXAMPLES

The present invention is described with reference to the following examples. It is to be understood that the examples are illustrative of and not limiting to the invention described herein.

Example 1

Figure 8:
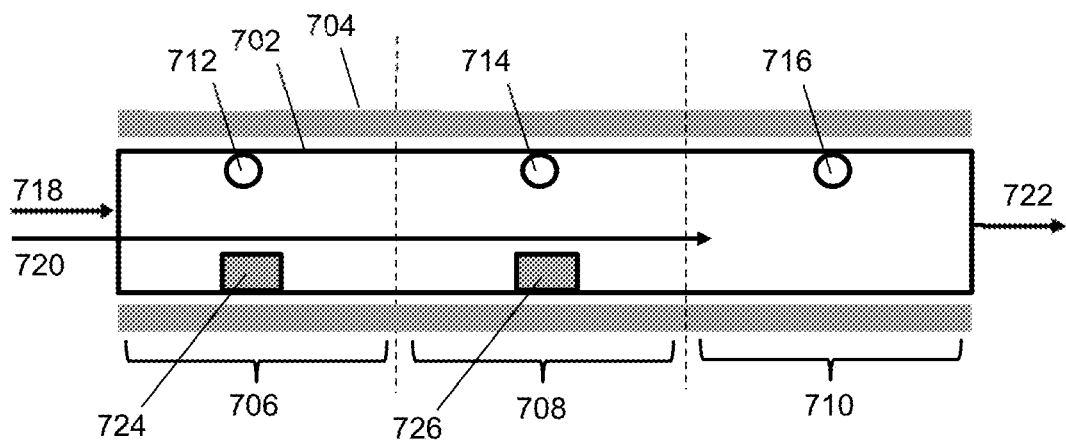
FIG. 8 schematically depicts the three-stage fixed bed laboratory reactor used in Example 1.

The decontamination of PFAS-contaminated organic soil was investigated in a three-stage fixed bed reactor as schematically depicted in FIG. 8. The reactor, made of quartz tube (702) with an inner diameter of 80 mm and a length of 1000 mm, was fully instrumented with monitoring and control of gas flow and temperature. The electrically heated furnace (704), which has three temperature zones, was used to provide thermal energy and temperature to the reactor in three independently controlled reaction zones (706, 708, and 710), with temperature measurement and control provided via separate thermocouples (712, 714 and 716 respectively). Controlled flows of air (718 and 720) were introduced to the first and third reaction zones (706 and 710) respectively, with the resultant exit flow of gases (722) from the reactor sent through a condenser followed by a caustic scrubber to condense any non-combustible gases and remove particulate matter, NOx and $SO_X$. The gases were then passed through a silica dryer to remove moisture before measurement in an online micro-GC analyser.

In each experiment, a sample of contaminated organic solids (2 g; PFAS contamination) was placed in a ceramic boat (724) in the middle of the first reaction zone. A sample of uncontaminated pyrolyzable organic material (2 g; risk husk biomass) was placed in a ceramic boat (726) in the middle of the second reaction zone. The flow rates of air into the first reaction zone (706) and into the third reaction zone were then set at 100 ml/min and 350 ml/min respectively. The set temperatures of the first, second and third reactions zones were set at 900° C., 700° C. and 900° C. respectively. A ramp rate of 35-45° C./min was used to heat each zone to its target temperature, and the target temperatures were maintained for 1 hour before cooling.

The contaminated organic material was partially oxidised in the flow of air (718) in the first reaction zone (706) at the high target temperature, ultimately leaving a residual solid material. The flow rate of the air to the first reaction zone (100 ml/min) was selected, based on a prior proximate and ultimate analysis of the contaminated soil when completely gasified, such that the consumption of the oxygen would result in a flow of gas into the combustion zone having an $O_2$ content of less than 1 wt %.

The uncontaminated pyrolyzable organic material was thus heated in the second reaction zone (708) to the target temperature (700° C.) in a non-oxidising gas atmosphere. Accordingly, pyrolysis reactions were expected to predominate in this material, resulting in the production of pyrolysis gas (comprising both condensable and non-condensable organic products) and residual carbonaceous material (biochar).

The pyrolysis gas was carried with the oxygen-depleted gas into the third combustion zone, where it was combusted in the presence of excess air flow 720 at the target temperature (900° C.). The flow rate of air to this reaction zone was selected, based on a prior analysis of the initial and ultimate composition of the uncontaminated pyrolyzable organic material when completely pyrolyzed, so that substantially complete combustion would be obtained and the flue gas leaving the reactor as flow 722 would have an $O_2$ content of at least 12 wt %.

The results of the experiments are shown in Table 1 below. Analyses were performed for three PFAS components, perfluorohexane sulfonic acid (PFHXs), perfluorooctane sulfonic acid (PFOS), and perfluorooctanoic acid (PFOA), to determine the amounts of these components in the initial contaminated soil material, in the post-combustion residual soil material and recovered in the scrubber water. The amount/percentage of PFAS destroyed was calculated as the total amount not present either in the residual soil or the scrubber water. In all three experiments, the soil material was substantially decontaminated of all PFAS components. The C8 PFAS components (perfluorooctane sulfonic acid and perfluorooctanoic acid) were predominantly destroyed in the process, whereas most of the C6 material (perfluorohexane sulfonic acid) was vaporised and recovered in the scrubber. It is believed that the difference is due to its lower boiling point which allowed vaporisation before oxidative destruction in the first reaction zone. A variety of shorter chain PFAS components were also detected in the scrubber water, consistent with partial PFAS destruction by partial oxidation.

TABLE 1

| Exp | PFAS component | In soil-initial (mg) | In soil-post combustion (mg) | Recovered in scrubber (mg) | PFAS destroyed (mg) | PFAS destroyed (%) |
|---|---|---|---|---|---|---|
| 1 | Perfluorohexane sulfonic acid | 0.0006 | 0.0001 | 0.0003 | 0.0002 | 33 |
|   | Perfluorooctane sulfonic acid | 0.0164 | 0.0001 | 0.0015 | 0.0148 | 90 |
|   | Perfluorooctanoic acid | 0.0097 | 0.0001 | 0.0015 | 0.0081 | 83 |
| 2 | Perfluorohexane sulfonic acid | 0.0004 | 0.0000 | 0.0003 | 0.0001 | 25 |
|   | Perfluorooctane sulfonic acid | 0.0114 | 0.0000 | 0.0015 | 0.0099 | 87 |
|   | Perfluorooctanoic acid | 0.0067 | 0.0000 | 0.0015 | 0.0052 | 77 |
| 3 | Perfluorohexane sulfonic acid | 0.0006 | 0.0001 | 0.0003 | 0.0002 | 34 |
|   | Perfluorooctane sulfonic acid | 0.0154 | 0.0001 | 0.0015 | 0.0138 | 90 |
|   | Perfluorooctanoic acid | 0.0091 | 0.0001 | 0.0015 | 0.0075 | 82 |

Example 2

Biosolids were sourced from Mount Martha Water Recycling Plant of South East Water Corporation, Victoria, Australia. This plant predominantly receives domestic and trade sewage, and treats sewage sludge through an activated sludge process followed by anaerobic digestion. After digestion, the solids are processed through a dewatering plant (i.e. centrifuge) and solar drying facility before they are sent to stockpiling. The biosolids sample was initially ground by a pin mill (Chenwei Machinery CW-20B) and then segregated with a vibrating screen (Sanfeng Machinery, SF-600). The resulting biosolids used in pyrolysis were of 0.5-2 mm particle size and had the composition show in Table 2.

TABLE 2

| | Proximate Analysis (dry weight basis) |
|---|---|
| Moisture (wt %) | 11 |
| Volatile Matter (wt %) | 60.6 |
| Ash Yield (wt %) | 29.0 |
| Fixed Carbon (wt %) | 10.4 |

TABLE 2-continued

| | Ultimate Analysis (dry weight basis) |
|---|---|
| Carbon | 38.3 |
| Hydrogen | 4.7 |
| Nitrogen | 6.0 |
| Oxygen | 21.0 |
| Sulphur | 0.96 |

Figure 9:
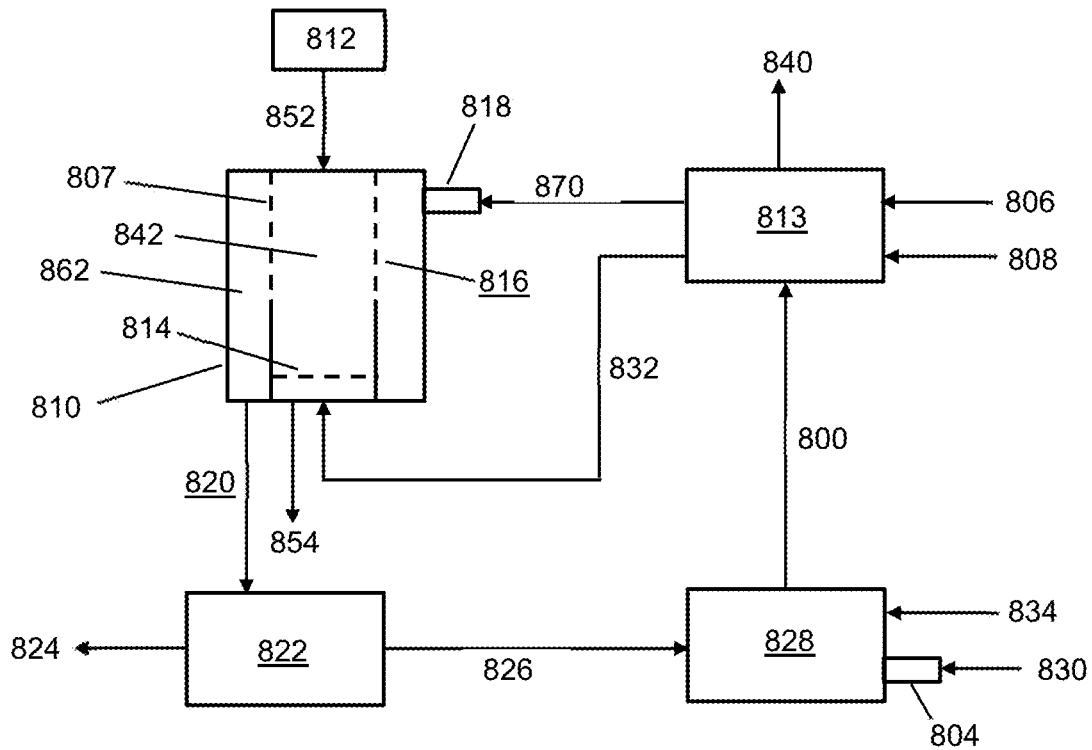
FIG. 9 schematically depicts a process flow diagram for the semi-pilot pyrolysis plant used in Example 2.

A semi-pilot pyrolysis plant was used to conduct a pyrolysis study on the biosolids. A process flow diagram for the pyrolysis plant is shown in FIG. 9. Each pyrolysis trial was conducted semi-continuously for 5 hours, with biosolids 852 fed continuously throughout the trial period while char 854 was collected only after the 5-hour period at the end of each trial. During start-up, the semi-pilot plant was heated via liquefied petroleum gas (LPG) burner 804. The hot flue gas leaving the LPG burner was used to pre-heat air 806 and $N_2/CO_2$ mixture 808 via heat exchanger 813. The pre-heated air 870 and $N_2/CO_2$ mixture 832 were then circulated in reactor system 810 to heat the reactor to a desired temperature. Reactor system 810, constructed from stainless steel 253MA and insulated with ceramic fibre insulation to minimise heat losses, was of concentric geometry, with an inner tube functioning as cylindrical pyrolyzer 842. The bottom half of the inner tube heat transmissive partition 807 was made of impermeable cylindrical pipe, while the top half of the partition consisted of cylindrical wedge-wire screen 816.

Hopper 812 was filled with biosolids feed at the beginning of each trial, and charged with $N_2$ via a $N_2$ purging line. Once the desired temperature of the reactor was attained, biosolids 852 were continuously charged at 0.25 kg/h from the hopper to pyrolzer 842 via a pre-calibrated screw-feeder with constant $N_2$ purging. The biosolids 852 were pyrolyzed at a bubbling fluidised condition using pre-heated $N_2/CO_2$ mixture 832, which contained 85% $N_2$, 15% $CO_2$ v/v and was fed to the pyrolyzer by distributor plate 814.

The produced gas and oil vapours from pyrolyzer 842 were continuously transferred to combustor 862, i.e. the annular space surrounding pyrolyzer 842, via the apertures in wedge-wire screen 816. The temperature in combustor 862 was controlled by adjusting the air inlet rate. In this study, the temperature in the combustor was deliberately kept below the pyrolysis temperature, so that the effect of the pyrolysis process itself on contaminants in the feedstock could be better understood. By feeding pre-heated hot air 870 tangentially via nozzle 818 at >10 m/s velocity into the annular combustor, the pyroloysis gas and vapours were partly combusted and ingress of air into pyrolyzer 842 was minimised. Residual pyrolysis gas and vapours were sent in combustor outlet stream 820 to water scrubber 822, where they were immediately quenched. Condensable pyrolysis oils 824 condensed in the scrubber water, while non-condensable pyrolysis gas 826 was sent to the combustion chamber 828 of LPG burner 804 fed with LPG 830 to ensure that it was fully combusted with air 834. The hot flue gas was used to preheat hot air 870 and $N_2/CO_2$ gas mixture 832 in heat exchanger 813 before releasing flue gas 840 to the atmosphere.

The concentration of $O_2$ inside pyrolyzer 842 was continuously monitored by an online gas monitor (Syngas Analyser, Madur Aqua GA40T Plus). The reactor system was equipped with four thermocouples for the following temperature measurements: 1) pyrolyzer 842 internal temperature (pyrolysis temperature), 2) annular combustor 862 internal temperature, 3) inlet temperature of $N_2/CO_2$ gas mixture 832 fed to pyrolyzer 842 and 4) inlet temperature of air 870 fed to combustor 862. At the end of each trial, a sample of the water scrubber was collected for oil and PFAS analysis. Biochar 854 was retained under an inert environment while cooling and then collected for analysis.

Figure 10:
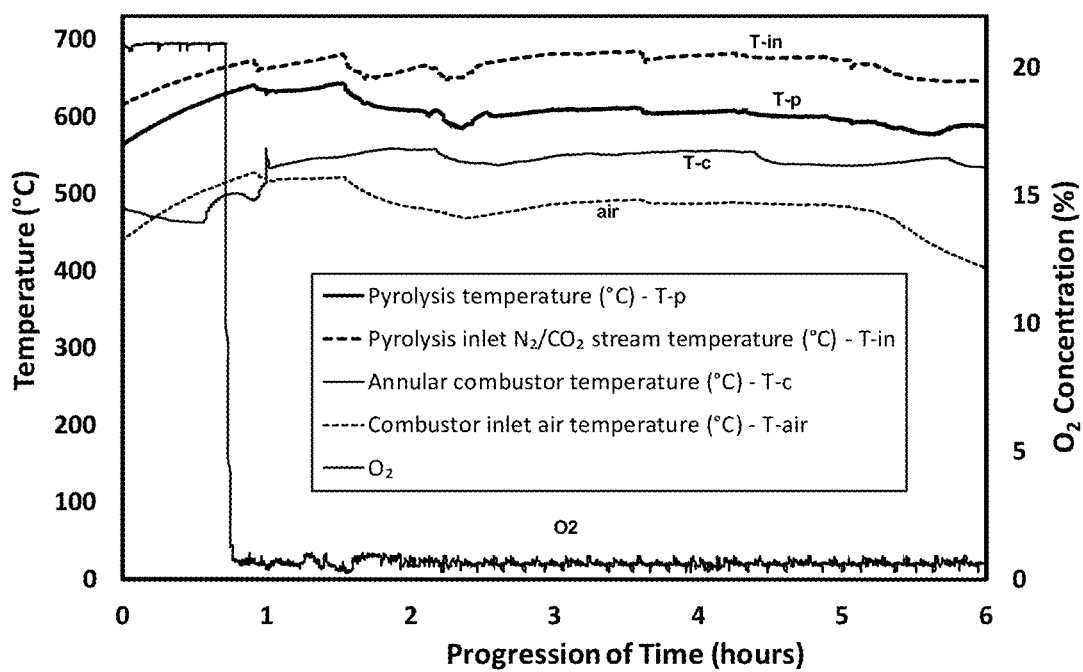
FIG. 10 is a graph showing key process temperatures and pyrolyzer $O_2$ concentrations during a five-hour pyrolysis trial at 600° C. in Example 2.

Pyrolysis trials were carried out at three different pyrolysis temperatures: 500, 550 and 600° C., with the average temperature at the pyrolyzer thermocouple considered as the pyrolysis temperature. Excellent process stability and pyrolyzer inertness was obtained. FIG. 10 shows the temperatures and pyrolyzer $O_2$ concentrations obtained in the trial at 600° C. The yield, composition and mean BET surface area (Micromeritics 2000/2400) of the biochar products are shown in Table 3. Scanning electron microscopy (SEM) imaging revealed a highly porous structure, with the porosity increasing with temperature.

TABLE 3

| Pyrolysis temperature (° C.) | 500 | 550 | 600 |
|---|---|---|---|
| Biochar yield | 45 | 41 | 36 |
| BET surface area (m²/g) | 26.5 | 44.1 | 55.3 |
| Proximate Analysis (dry weight basis) | | | |
| Moisture (wt %) | 1.7 | 1.3 | 2.0 |
| Volatile Matter (wt %) | 13.2 | 12.1 | 10.9 |
| Ash Yield (wt %) | 64.9 | 66.8 | 68.0 |
| Fixed Carbon (wt %) | 19.1 | 21.4 | 10.9 |
| Ultimate Analysis (dry weight basis) | | | |
| Carbon | 29.27 | 28.01 | 27.21 |
| Hydrogen | 1.66 | 1.58 | 1.38 |
| Nitrogen | 3.25 | 2.78 | 2.60 |
| Oxygen | 0.49 | 0.41 | 0.35 |
| Sulphur | 0.46 | 0.44 | 0.43 |

The biosolids feedstock, biochar products and scrubber water were analysed for PFAS compounds, and the results (applicable for all experiments) are shown in Table 4.

TABLE 4

| PFAS Species | Formula | Biosolids (mg/kg) | Biochar (mg/kg) | Scrubber water (mg/kg) |
|---|---|---|---|---|
| Perfluorobutane sulfonic acid (PFBS) | $F(CF_2)_4SO_3H$ | 0.0022 | <0.0002 | <0.02 |
| Perfluorohexane sulfonic acid (PFHxS) | $F(CF_2)_6SO_3H$ | 0.0006 | <0.0002 | <0.02 |
| Perfluorooctane sulfonic acid (PFOS) | $F(CF_2)_8SO_3H$ | 0.0148 | <0.0002 | <0.01 |
| Perfluorobutanoic acid (PFBA) | $F(CF_2)_3COOH$ | 0.0020 | <0.001 | <0.1 |
| Perfluoropentanoic acid (PFPeA) | $F(CF_2)_4COOH$ | 0.0023 | <0.0002 | <0.02 |

TABLE 4-continued

| PFAS Species | Formula | Biosolids (mg/kg) | Biochar (mg/kg) | Scrubber water (mg/kg) |
|---|---|---|---|---|
| Perfluorohexanoicacid (PFHxA) | $F(CF_2)_5COOH$ | 0.0037 | <0.0002 | <0.02 |
| Perfluoroheptanoic acid (PFHpA) | $F(CF_2)_6COOH$ | 0.0013 | <0.0002 | <0.02 |
| Perfluorooctanoic acid (PFOA) | $F(CF_2)_7COOH$ | 0.0086 | <0.0002 | <0.01 |
| 10:2 Fluorotelomer sulfonic acid (10:2 FTS) | $F(CF_2)_{10}(CH_2CH_2)SO_3H$ | 0.0013 | <0.0005 | <0.05 |

A wide range of PFAS compounds were present in quantifiable amounts in the biosolids feedstock. However, all of these species were below the detection limits in both the biochar and the scrubber water. The PFAS compounds were vaporised and/or destroyed in the pyrolysis reaction, so that the final biochar product was essentially PFAS-free.

Example 3

Figure 11:
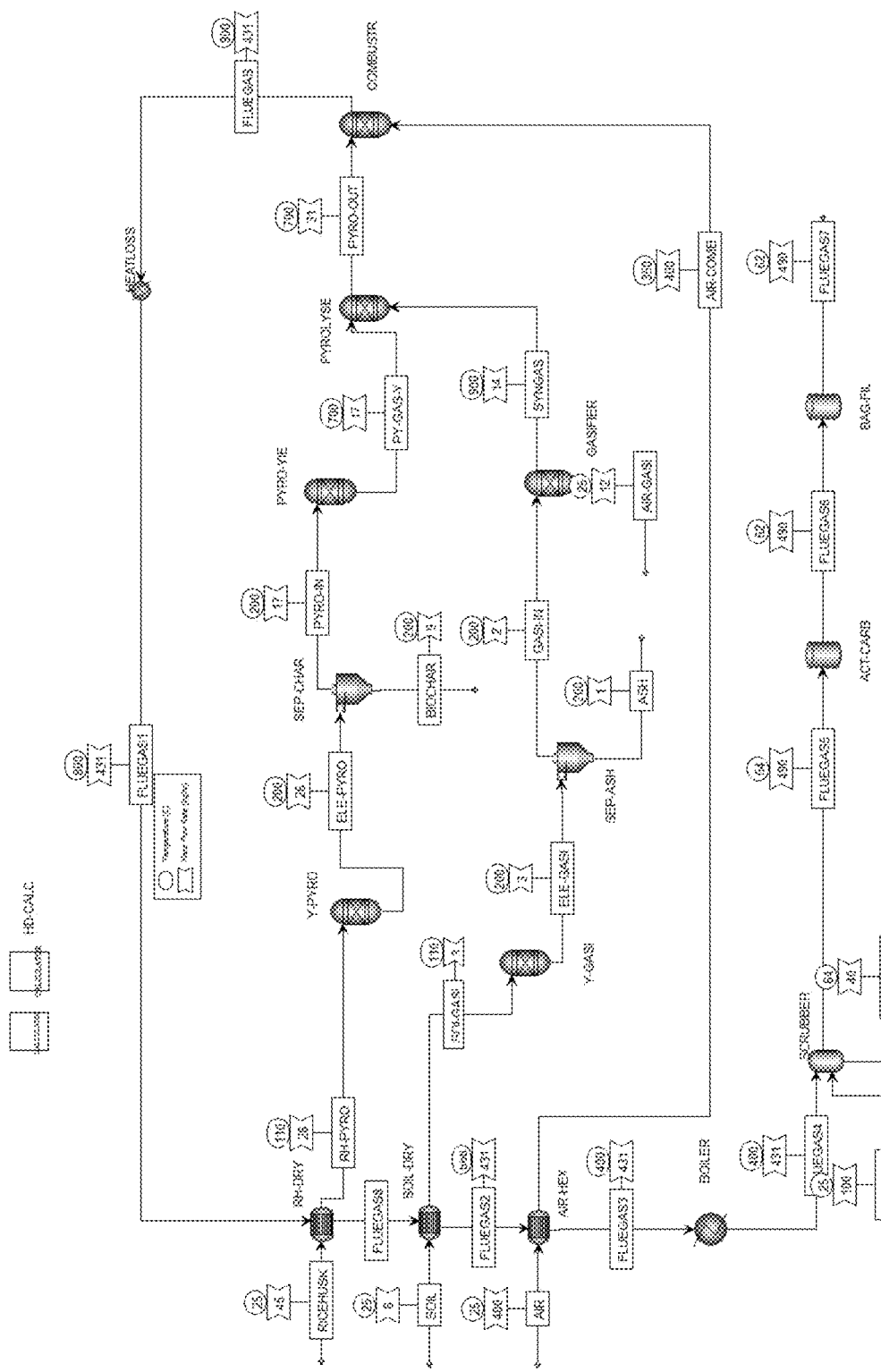
FIG. 11 shows an ASPEN Plus flow sheet used in Example 3 to model the systems and methods according to embodiments of the invention.

A process for integrated soil decontamination, pyrolysis, combustion and energy generation was modelled using ASPEN Plus. FIG. 11 depicts the ASPEN Plus flow sheet, while Table 5 below presents a brief description of the unit operation blocks shown in FIG. 11. The ASPEN process model contains five main process steps, including pre-treatment of feed stocks, gasification of contaminated organic solids, pyrolysis of an organic waste, combustion of the pyrolysis gases and energy generation from the hot flue gas. Key model assumptions are: steady state conditions, zero-dimensional model, isothermal reactions (uniform bed temperature), a yield of 30% residual solids from the gasification stage and a yield of 35% biochar in the pyrolysis stage.

TABLE 5

| ASPEN plus name | Block ID | Description |
|---|---|---|
| RYIELD | Y-PYRO | Yield reactor - converts the non-conventional stream (contaminated organic soil) into conventional components |
|  | Y-GASI | Yield reactor - converts the non-conventional stream (rice husk biomass) into conventional components |
|  | PYRO-YIE | Yield reactor - provide gas and oil distribution according to lab experiment results |
| Separator | SEP-CHAR | Separator - separates a portion of the biochar contained in the fuel so that it remains unreacted |
|  | SEP-ASH | Separator-separates the inert ash from the gas to allow removal from the system |
| R-Gibbs | PYROLYSE | Gibbs free energy reactor - simulates pyrolysis |
|  | GASIFIER | Gibbs free energy reactor - simulates combustion/gasification |
|  | COMBUSTR | Gibbs free energy reactor - simulates combustion of pyrolysis gases |

TABLE 5-continued

| ASPEN plus name | Block ID | Description |
|---|---|---|
| Heat exchanger | RH-DRY | Heat exchanger - removes the moisture from the rice husk |
|  | SOIL-DRY | Heat exchanger - removes the moisture from the soil |
|  | BOILER | Heat exchanger - extracts energy from high temperature off-gas stream |
|  | AIR-HEX | Heat exchanger - preheats the air required for GASIFIER and COMBUSTR |

Pre-treatment of solid feed streams. Moisture present in contaminated organic soil and biomass, i.e. rice husk organic waste (SOIL and RICEHUSK respectively in FIG. 11) is dried in indirect contact dryers (SOIL-DTY and RH-DRY respectively) using the hot exhaust gases (FLUEGAS) from the pyrolysis gas combustor (COMBUSTR). The amount of air fed to the combustor is controlled by design specification to maintain an exhaust gas flow sufficiently high to dry the contaminated organic soil and biomass to the desired water content and to preheat the air feed (AIR-HEX) to 350° C. for the pyrolysis gas combustor (COMBUSTR). The SOIL and RICEHUSK streams in FIG. 11 were specified as non-conventional streams and the proximate and ultimate analyses were manually inputted based on analysis lab experimental data. The stream thermodynamic conditions and mass flow rates were also entered.

Gasification reactor. The contaminated soil (SOI-GASI) enters the gasification yield reactor (Y-GASI) where the non-conventional composition is converted by a calculator block to provide a mass flow of conventional components in the block outlet stream (ELE-GASI). A residual ash component (ASH) is modelled as a non-conventional component with realistic 5 wt % carbon and ash content. The ash component is then separated in a cyclone separator block (SEP-ASH), and the remaining soil feed components (GASI-IN) are sent to the gasifier reactor block (GASIFIER). The mass flow of air (AIR-GASI) entering the gasifier reactor is set according to the specific gasifier product gas (SYNGAS) composition to be achieved, and in particular an $O_2$ content of substantially zero. The soil and air streams (GASI-IN and 'AIR-GASI') react at 900° C. via combustion/gasification reactions in the gasifier reaction block (GASIFIER). The product gas stream (SYNGAS) is discharged and sent on to the pyrolysis block. The composition of the product gas stream is shown in Table 7 below.

Pyrolysis reactor. The dry rice husk biomass (RH-PYRO) enters the pyrolysis yield reactor (Y-PYRO) where the non-conventional composition is converted by a calculator block to provide a mass flow of conventional components in the block outlet stream (ELE-PYRO). A residual biochar (BIOCHAR) is modelled as a non-conventional component with realistic C, O, H, N, S and ash content. The biochar component is then separated in a cyclone separator block (SEP-CHAR), and the remaining biomass feed (PYRO-IN) is sent to the pyrolysis reactor block (PYRO-YIE). This reactor operating at 700° C. yields gas and oil pyrolysis products determined via a predictive calculation derived from experimental laboratory results with over 100 different compounds considered as products, with the product composition depending on the feedstock composition and lab scale reactor conditions. The pyrolysis product stream (PY-GAS-Y) and the gasifier product stream (SYNGAS) them enter the gas mixing block (PYROLYSE), where further reactions occur at 700° C. The resulting gas mixture (PYRO-OUT) is discharged and sent on to the combustor block.

Combustor. The gas mixture (PYRO-OUT) containing pyrolysis gas produced in the pyrolysis block enters the combustion reactor (COMBUSTR) where combustion occurs at 900° C. in the presence of the preheated air stream (AIR-COMB) introduced at 350° C. The hot exhaust gas (FLUEGAS) then dries the solid feedstocks and preheats the air. Finally, the heat is utilised in a boiler (BOILER) operating at 500° C. to generate energy, and the cooled exhaust gas (FLUEGAS4) is sent through a scrubber (SCRUBBER), activated carbon bed (ACT-CARB) and a bag filter (BAG-FIL) before venting.

Key inputs and results of the simulation are shown in Tables 6 to 9 below. Table 6 shows the feed rates and composition of the two solid feeds. Table 7 shows the product gas composition (SYNGAS), formed by partial oxidation of the contaminated soil in the gasification reactor. Table 8 shows the pyrolysis product yields at 700° C. (as here described) and also at a range of other simulated pyrolysis temperatures. The biochar product contains about 68-70 wt % fixed carbon. Overall, about 30-40% of the carbon fed to the process is sequestered in the biochar.

Table 9 shows the energy consumption/output of each process unit. The combustor produces sufficient energy to provide the heat of pyrolysis in the pyrolysis unit, even accounting for energy losses. The overall process results in a net thermal energy generation of 120 kW. Moreover, a contaminated soil stream is decontaminated, and biochar is produced as a useful product of the process, thus capturing a significant fraction of carbon in a stable form and so avoiding greenhouse gas emissions.

TABLE 6

| Parameter | Contaminated soil | Biomass (Rice husk) |
| --- | --- | --- |
| Feed rate (tonnes/day) | 4 | 6 |
| Proximate Analysis | | |
| Moisture (wt %) | 11 | 8.9 |
| Volatile Matter (wt %) | 60.6 | 72 |
| Ash Yield (wt %) | 29 | 12.1 |
| Fixed Carbon (wt %) | 10.4 | 15.9 |
| Ultimate Analysis | | |
| Carbon | 38.3 | 49.5 |
| Hydrogen | 4.7 | 5.7 |
| Nitrogen | 6.0 | 0.5 |
| Oxygen | 21 | 32.1 |
| Sulphur | 1.0 | 0.03 |
| Chlorine | 0 | 0.14 |

TABLE 6-continued

| Parameter | Contaminated soil | Biomass (Rice husk) |
| --- | --- | --- |
| Calorific value | | |
| Gross Dry Calorific Value (MJ/kg) | 16.2 | 19.3 |
| Gross Wet Calorific Value (MJ/kg) | 14.4 | 17.5 |
| Net Wet Calorific Value (MJ/kg) | 13.3 | 16.3 |

TABLE 7

| Component | Fraction (Vol %) |
| --- | --- |
| $O_2$ | 0 |
| $CO_2$ | 15 |
| $N_2$ | 68 |
| $H_2O$ | 14 |
| CO | 2 |
| $H_2$ | 1 |
| $CH_4$ | 0 |
| $SO_2$ | 0 |

TABLE 8

| Temperature (° C.) | Biochar yield (wt %) | Pyrolysis oil yield (wt %) | Pyrolysis gas yield (wt %) |
| --- | --- | --- | --- |
| 450 | 46.5 | 37 | 16.5 |
| 500 | 45.4 | 37.2 | 17.4 |
| 550 | 44.2 | 37.3 | 18.5 |
| 600 | 44.1 | 37.6 | 18.3 |
| 650 | 43.8 | 37.8 | 18.4 |
| 700 | 43.2 | 37.9 | 18.9 |
| 750 | 42.1 | 38.1 | 19.8 |
| 800 | 42.2 | 38.6 | 19.2 |
| 850 | 41.7 | 38.6 | 19.7 |

TABLE 9

| Unit | Thermal energy generation (kW) |
| --- | --- |
| Gasifier | −10 |
| Pyrolysis | 350 |
| Combustor | −390 |
| Boiler | −70 |
| Net thermal energy generation | −120 |

Example 4

A process for integrated gasification, pyrolysis, combustion and energy generation using a single contaminated biosolids feedstock, as described herein with reference to FIG. 5, was modelled using ASPEN Plus via a similar modelling approach as described in Example 3. The ASPEN process model contained five main process steps, including: (1) pre-treatment (drying) of wet biosolid feedstock 501 in dryer 502 using hot flue gas 572, (2) gasification of dried biosolids fraction 586 in gas producer 520, (3) pyrolysis of dried biosolids fraction 552 in the presence of producer gas 532 in pyrolyzer 540, (4) combustion of the resulting pyrolysis gases in combustor 560, and (5) energy generation from residual heat in the hot flue gas in energy generation unit 511. Key model assumptions are: steady state conditions, zero-dimensional model, isothermal reactions (uniform bed temperature), a yield of 30% residual solids from the gasification stage and a yield of 35% char in the pyrolysis stage. The modelled feed rate of biosolid feedstock 501 to the process was 0.48 tonnes/day (dry basis). Biosolids feedstock 501 had a water content of 50 wt %, and was dried in dryer 502 to 15 wt % water. The gas producer, pyrolysis and combustion temperatures were modelled at 900° C., 700° C. and 900° C. respectively. The boiler in energy generation unit 511 was operated at 500° C., and air feed 570 was preheated in heat exchanger 513 to 350° C.

Key variables that were investigated were: (1) the calorific value of biosolids feedstock 501 (Gross Dry Calorific Value)—in the range of 11 to 20 MJ/kg; (2) the solids content of biosolids feedstock 501—in the range of 20 to 80 wt %; and (3) the gas producer: pyrolyzer feed ratio, i.e. the ratio of dried biosolids fraction 586 sent to gas producer 520 to dried biosolids fraction 552 sent to pyrolyzer 540—in the range of 0.2:0.8 to 0.8:0.2.

Figure 12:
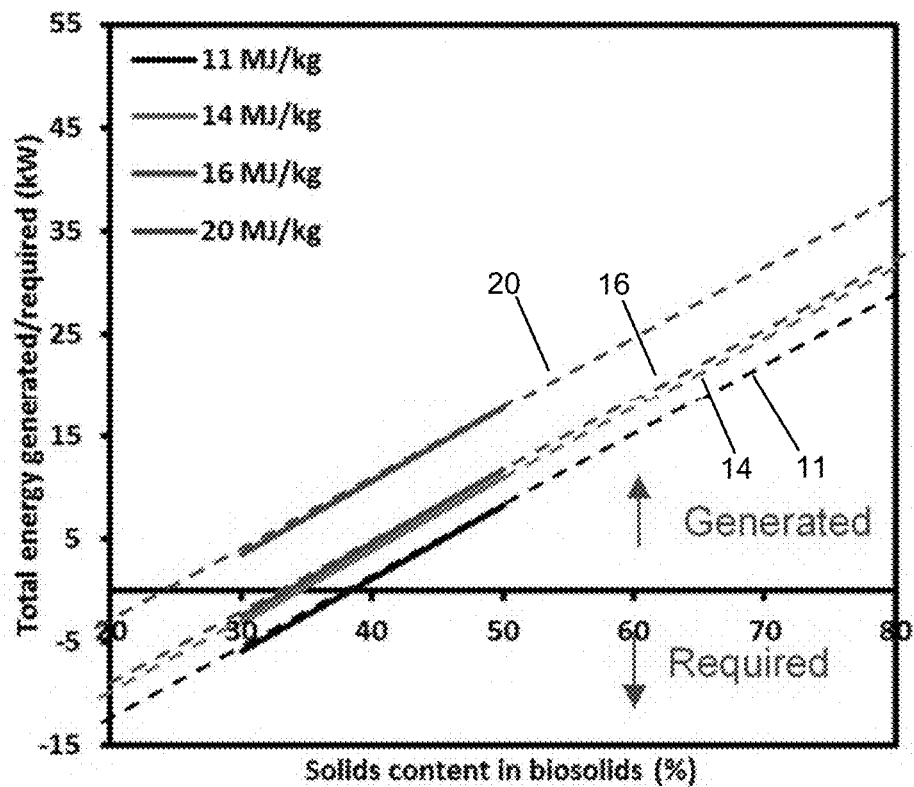
FIG. 12 is a graph showing the total energy balance of a process as depicted in FIG. 5, as a function of the solids content in biosolids feedstock and biosolids energy content, at a gas producer:pyrolyzer feed ratio of 0.2, as modelled in Example 4.
Figure 13:
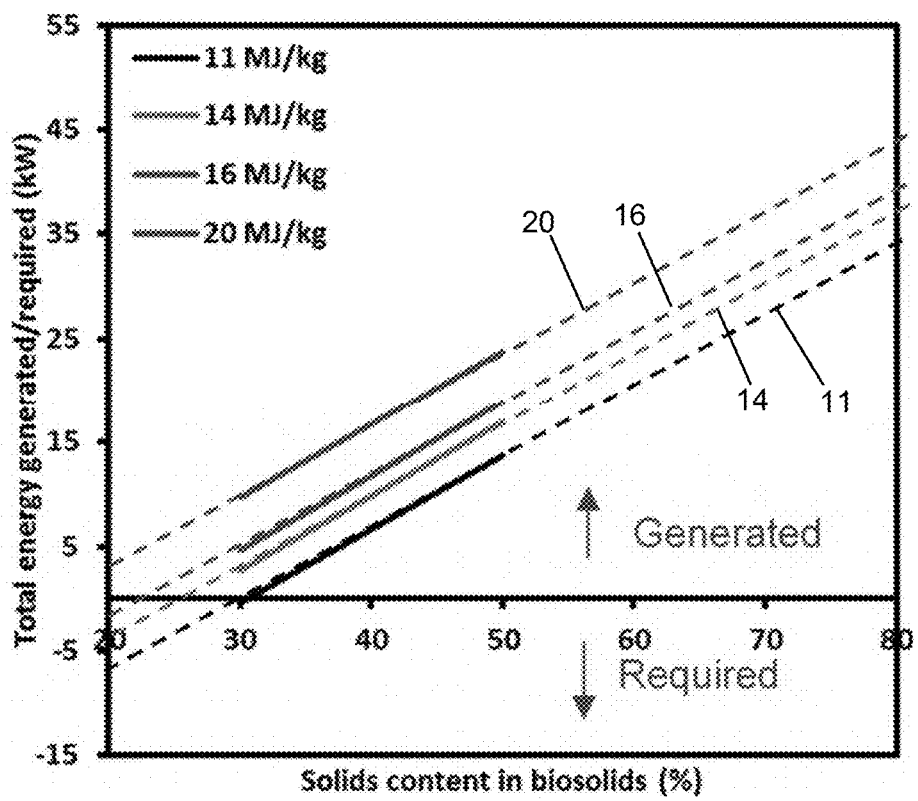
FIG. 13 is a graph showing the total energy balance of a process as depicted in FIG. 5, as a function of the solids content in biosolids feedstock and biosolids energy content, at a gas producer: pyrolyzer feed ratio of 0.5, as modelled in Example 4.
Figure 14:
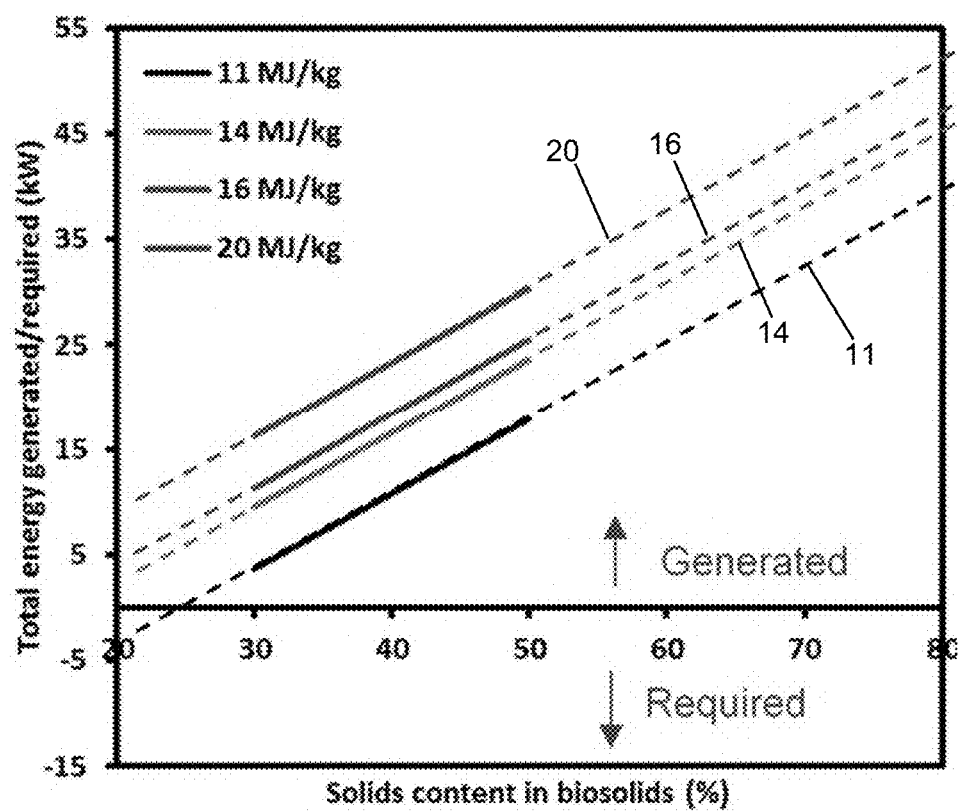
FIG. 14 is a graph showing the total energy balance of a process as depicted in FIG. 5, as a function of the solids content in biosolids feedstock and biosolids energy content, at a gas producer: pyrolyzer feed ratio of 0.8, as modelled in Example 4.

One model output of interest was the overall energy balance of the process, as it is desirable that the overall process results in a net thermal energy generation rather than an energy input requirement, even when the biosolids feed is wet (low solids content) or of low energy value. Typical biosolids feedstocks have a solids content in the range of 30-50 wt %. Selected results for the total energy generated (or required) are shown in FIGS. 12, 13 and 14 for gas producer: pyrolyzer feed ratios of 0.2:0.8, 0.5:0.5 and 0.8:0.2 respectively. It is evident that when only a small fraction of the total biosolids is sent to the gas producer (see FIG. 12; gas producer: pyrolyzer feed ratio of 0.2:0.8), the process is close to energy neutral or even requires energy input in realistic scenarios, particularly where the solids content of feedstock 501 is less than 40%. By contrast, when a significant fraction of the biosolids is sent to the gas producer (see FIG. 14; gas producer: pyrolyzer feed ratio of 0.8:0.2), the process results in net thermal energy generation in all modelled scenarios.

For the case where the gas producer: pyrolyzer feed ratios is 0.2:0.8, the biochar yield from pyrolysis will be about 0.135 tonnes/day, giving a carbon sequestration percentage estimated as 23%.

The results demonstrate that the process can be operated flexibly depending on the feedstock composition. For a low energy content and/or wet biomass feedstock, a greater proportion of the feed can be directed to the exothermic gas producer to maintain an overall positive energy output. For a high energy content and/or drier biomass feedstock, there is an opportunity to increase the proportion of the biomass feed directed to the endothermic pyrolysis process, while still remaining energy positive. The advantage of this is that a higher yield of biochar 654, and lower carbon emissions, will be achieved. In all cases, the gas producer advantageously provided a suitable gas medium in which pyrolysis can be conducted, without the need for an inert gas feed to the process.

Furthermore, as demonstrated in Examples 1 and 2, contaminated biosolid feedstocks 501, including PFAS-contaminated feedstocks, can be remediated in the process, since treatment in both gas producer 620 and pyrolyzer 640 results in volatilisation and/or destruction of the contaminants.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A system for pyrolysis of a pyrolyzable organic feed which produces a carbonaceous pyrolysis product, the system comprising:
(i) a gas producer comprising a gasification zone and a producer gas outlet, wherein the gas producer is configured to:
  oxidise at least one carbon-containing feed in the presence of an oxidising gas in the gasification zone to form a producer gas; and
  discharge the producer gas from the gasification zone via the producer gas outlet,
  wherein a residual oxygen content of the producer gas is substantially depleted or maintained below a maximum predetermined amount by controlling a ratio of oxygen fed to the gasification zone to the carbon-containing feed,
(ii) a pyrolyzer comprising a pyrolysis zone and one or more pyrolyzer gas outlets, wherein the pyrolyzer is configured to:
  feed the producer gas discharged from the gasification zone to the pyrolysis zone;
  pyrolyze a pyrolyzable organic feed in the pyrolysis zone by fluidizing the pyrolyzable organic feed in a flow of the producer gas to produce a carbonaceous pyrolysis product and a gas mixture comprising combustible components wherein the pyrolyzable organic feed and the carbonaceous pyrolysis product are fluidized in the pyrolysis zone for a residence time of at least 10 minutes; and
  discharge the gas mixture from the pyrolysis zone via the one or more pyrolyzer gas outlets, and
(iii) a first combustor comprising a combustion zone, wherein the first combustor is configured to:
  receive the gas mixture discharged from the pyrolysis zone in the combustion zone;
  feed an oxygen-containing gas to the combustion zone; and
  combust at least a portion of the combustible components present in the gas mixture in the combustion zone to produce a combustion product gas,
  wherein the system is configured to discharge at least a portion of the carbonaceous pyrolysis product from the pyrolyzer as an unoxidized product from the system, wherein the discharged carbonaceous pyrolysis product is not oxidised in either the first combustor or the gas producer;
  wherein the combustible components in the gas mixture discharged from the pyrolysis zone and received in the combustion zone comprise both a non-condensable gas fraction of the pyrolysis gas and a vaporised condensable oil fraction of the pyrolysis gas, and
  wherein the system is configured to (i) combust the combustible components with excess oxygen in the first combustor or (ii) to partially combust the combustible components in the first combustor and to combust residual combustible components in the combustion product gas with excess oxygen in a further combustor.

2. A system according to claim 1, wherein the gas producer is configured to partially oxidise the at least one carbon-containing feed such that the producer gas comprises carbon monoxide and/or hydrogen.

3. A system according to claim 1, wherein the gas producer is configured to feed a first contaminated solid material to the gasification zone for vaporisation and/or destruction of one or more contaminants therein, wherein the gas producer comprises a solid material inlet for feeding the first contaminated solid material to the gasification zone and a solid material outlet for discharging a decontaminated solid material from the gasification zone, wherein (i) the first contaminated material forms all or part of the at least one carbon-containing feed to the gas producer, and/or (ii) a separate carbon-containing material forms at least part of the at least one carbon-containing feed to the gas producer.

4. A system according to claim 1, configured to: separate a feedstock into first and second fractions; direct the first fraction to the gas producer to form at least a portion of the at least one carbon-containing feed; direct the second fraction to the pyrolyzer to form at least a portion of the pyrolyzable organic feed; and, optionally, adjust the ratio of the first fraction to the second fraction to vary a net energy output of the system.

5. A system according to claim 1, wherein the pyrolysis zone is separated from the combustion zone by a heat-transmissive partition configured to transmit heat from the combustion zone to the pyrolysis zone.

6. A system according to claim 5, wherein the one or more pyrolyzer gas outlets comprise a plurality of apertures in the heat-transmissive partition.

7. A system according to claim 1, further comprising:
one or more heat exchange conduits configured to carry the combustion product gas through the pyrolysis zone, thereby heating the fluidised pyrolyzable organic feed.

8. A system according to claim 4, configured to adjust the ratio of the first fraction to the second fraction to vary a net energy output of the system.

9. A system according to claim 1, configured to (i) partially combust the combustible components in the first combustor, (ii) transfer heat from the combustion zone of the first combustor to the pyrolysis zone of the pyrolyzer, and (iii) regulate the feed of oxygen-containing gas to the combustion zone, thereby maintaining the temperature in the pyrolysis zone within a target range.

10. A method of pyrolysis of a pyrolyzable organic feed which produces a carbonaceous pyrolysis product utilizing the system of claim 1 to produce the carbonaceous pyrolysis product, the method comprising steps of:
feeding the at least one carbon-containing feed and the oxidising gas to the gasification zone and oxidising the carbon-containing feed therein to form the producer gas; wherein the residual oxygen content in the producer gas is substantially depleted or maintained below the maximum predetermined amount by controlling the ratio of oxygen fed to the gasification zone to the carbon-containing feed;
feeding the producer gas from the gasification zone to the pyrolysis zone;
pyrolyzing the pyrolyzable organic feed in the pyrolysis zone by fluidizing the pyrolyzable organic feed in the flow of the producer gas to produce the carbonaceous pyrolysis product and the gas mixture comprising combustible components wherein the pyrolyzable organic feed and the carbonaceous pyrolysis product are fluidized in the pyrolysis zone for a residence time of at least 10 minutes;
discharging the gas mixture from the pyrolysis zone into the combustion zone, wherein the combustible components in the gas mixture discharged from the pyrolysis zone into the combustion zone comprise both a non-condensable gas fraction of the pyrolysis gas and a vaporised, condensable oil fraction of the pyrolysis gas;
feeding the oxygen-containing gas to the combustion zone; and
combusting the combustible components in the combustion zone to form the combustion product gas, wherein (i) the combustible components are combusted with excess oxygen in the combustion zone in the first combustor, or (ii) the combustible components are partially combusted in the combustion zone in the first combustor and residual combustible components in the combustion product gas are combusted with excess oxygen in the further combustor,
and discharging the at least a portion of the carbonaceous pyrolysis product from the pyrolyzer as the unoxidized product, wherein the discharged carbonaceous pyrolysis product is not oxidised in either the combustion zone or the gasification zone.

11. A method according to claim 10, wherein the maximum predetermined amount is no more than 1 wt %.

12. A method according to claim 10, wherein the at least one carbon-containing feed is partially oxidised such that the producer gas comprises carbon monoxide and/or hydrogen.

13. A method according to claim 10, further comprising feeding a first contaminated solid material to the gasification zone, wherein one or more contaminants in the first contaminated solid material are vaporised and/or destroyed therein, wherein (i) the first contaminated material forms all or part of the at least one carbon-containing feed to the gasification zone, and/or (ii) a separate carbon-containing material is added to form at least part of the at least one carbon-containing feed to the gasification zone.

14. A method according to claim 13, wherein the contaminants include one or more per- and polyfluoroalkyl substances (PFAS).

15. A method according to claim 13, wherein the first contaminated solid material comprises biosolids.

16. A method according to claim 10, the method further comprising steps of:
separating a feedstock into first and second fractions;
directing the first fraction to the gasification zone to form at least a portion of the at least one carbon-containing feed; and
directing the second fraction to the pyrolysis zone to form at least a portion of the pyrolyzable organic feed.

17. A method according to claim 16, further comprising: adjusting the ratio of the first fraction to the second fraction to vary a net energy output of the system.

18. A method according to claim 10, wherein the pyrolysis zone is separated from the combustion zone by a heat-transmissive partition, and wherein at least a portion of the heat of pyrolysis is provided by transmission of heat from the combustion zone to the pyrolysis zone through the partition.

19. A method according to claim 18, wherein the heat-transmissive partition comprises a plurality of apertures, and the gas mixture flows from the pyrolysis zone to the combustion zone via the apertures.

20. A method according to claim 10, wherein the pyrolyzable organic feed comprises biosolids.

* * * * *